United States Patent
Lim et al.

(10) Patent No.: US 9,244,302 B2
(45) Date of Patent: Jan. 26, 2016

(54) DISPLAY DEVICE AND A METHOD OF MANUFACTURING THE SAME

(71) Applicant: SAMSUNG DISPLAY CO., LTD., Yongin, Gyeonggi-Do (KR)

(72) Inventors: Tae Woo Lim, Hwaseong-Si (KR); Hee-Keun Lee, Suwon-Si (KR); Hoon Kang, Hwaseong-Si (KR); Sung Ju Kim, Hwaseong-Si (KR); Yeun Tae Kim, Suwon-Si (KR); Yu Deok Seo, Hwaseong-Si (KR); Koichi Sugitani, Hwaseong-Si (KR); Chae Kyung Tae, Hwaseong-Si (KR); Cha-Dong Kim, Seoul (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/036,961

(22) Filed: Sep. 25, 2013

(65) Prior Publication Data

US 2014/0198290 A1 Jul. 17, 2014

(30) Foreign Application Priority Data

Jan. 16, 2013 (KR) .......................... 10-2013-0004997

(51) Int. Cl.
*G02F 1/1343* (2006.01)
*G02F 1/1333* (2006.01)

(52) U.S. Cl.
CPC .... *G02F 1/133377* (2013.01); *G02F 1/134363* (2013.01); *G02F 2001/133302* (2013.01)

(58) Field of Classification Search
CPC .................. G02F 1/134336; G02F 1/1341
USPC ............. 349/155, 156, 138, 189, 143; 438/30
See application file for complete search history.

(56) References Cited

U.S. PATENT DOCUMENTS

| | | | | |
|---|---|---|---|---|
| 5,386,307 A | * | 1/1995 | Jang ............................... | 349/81 |
| 5,978,062 A | * | 11/1999 | Liang et al. ................... | 349/155 |
| 5,986,729 A | * | 11/1999 | Yamanaka et al. ............. | 349/79 |
| 6,141,072 A | * | 10/2000 | Drabik ................ | G02F 1/13394 216/23 |
| 6,400,430 B2 | | 6/2002 | Nakao et al. | |
| 6,469,761 B1 | | 10/2002 | Drabik et al. | |

(Continued)

FOREIGN PATENT DOCUMENTS

JP   2003-330130   11/2003
JP   2008-256969   10/2008

(Continued)

OTHER PUBLICATIONS

English Abstract for Publication No. 10-0270996.

(Continued)

*Primary Examiner* — Sang V Nguyen
(74) *Attorney, Agent, or Firm* — F. Chau & Associates, LLC

(57) ABSTRACT

The present invention relates to a display device and a method of manufacturing the display device. The display device according to an exemplary embodiment of the present invention includes a substrate. A pixel electrode is formed on the substrate. A roof layer is formed on the pixel electrode. A first micro-cavity and a second micro-cavity are disposed between the pixel electrode and the roof layer. A liquid crystal fills the first and second micro-cavities. The first and second micro-cavities are connected to each other by a path. The path penetrates the roof layer.

10 Claims, 31 Drawing Sheets

(56) References Cited

U.S. PATENT DOCUMENTS

| | | |
|---|---|---|
| 6,870,654 B2 | 3/2005 | Lin et al. |
| 6,912,038 B2 | 6/2005 | Liao et al. |
| 6,995,890 B2 | 2/2006 | Lin |
| 7,123,319 B2 | 10/2006 | Broer et al. |
| 7,126,738 B2 | 10/2006 | Miles |
| 7,547,565 B2 | 6/2009 | Lin |
| 7,723,850 B2 | 5/2010 | Gallagher et al. |
| 7,961,273 B2 * | 6/2011 | Moriya et al. .................. 349/75 |
| 8,203,686 B2 | 6/2012 | Hatano et al. |
| 8,629,967 B2 * | 1/2014 | Choi ................. G02F 1/133377 349/106 |
| 2006/0146267 A1 | 7/2006 | Choi et al. |
| 2011/0156995 A1 * | 6/2011 | Choi et al. ...................... 345/92 |
| 2011/0242227 A1 * | 10/2011 | Togashi ............... B41J 2/14274 347/70 |
| 2012/0062448 A1 * | 3/2012 | Kim .................. G02F 1/133377 345/55 |
| 2012/0176561 A1 | 7/2012 | Kim et al. |
| 2013/0335664 A1 * | 12/2013 | Shim et al. ..................... 349/43 |

FOREIGN PATENT DOCUMENTS

| | | |
|---|---|---|
| KR | 10-0270996 | 8/2000 |
| KR | 10-2003-0063656 | 7/2003 |
| KR | 10-0685940 | 2/2007 |
| KR | 1020140065271 | 5/2014 |
| KR | 1020140090851 | 7/2014 |

OTHER PUBLICATIONS

English Abstract for Publication No. 10-2003-0063656.
English Abstract for Publication No. 2003-330130.
English Abstract for Publication No. 10-0685940.
English Abstract for Publication No. 2008-256969.

* cited by examiner

DISPLAY DEVICE AND A METHOD OF MANUFACTURING THE SAME

CROSS-REFERENCE TO RELATED APPLICATION

This application claims priority under 35 U.S.C. §119 to Korean Patent Application No. 10-2013-0004997 filed in the Korean Intellectual Property Office on Jan. 16, 2013, the disclosure of which is incorporated by reference herein in its entirety.

TECHNICAL FIELD

Exemplary embodiment of the present invention relate to displays, and more specifically, to a display device and a method of manufacturing the display device.

DISCUSSION OF THE RELATED ART

A liquid crystal display includes two panels and a liquid crystal layer disposed between the panels. The two display panels are respectively called a thin film transistor array panel and an opposing display panel. On the thin film transistor array panel are formed gate lines and data lines crossing the gate lines, thin film transistors connected to the gate lines and the data lines, and pixel electrodes connected to the thin film transistors. On the opposing display panel are formed light blocking members, color filters, and a common electrode. The light blocking members, the color filters, and the common electrode may be formed on the thin film transistor array panel not on the opposing display panel.

SUMMARY

A display device according to an exemplary embodiment of the present invention includes a substrate. A thin film transistor is formed on the substrate. A pixel electrode is connected to the thin film transistor. The pixel electrode is formed on the substrate. A roof layer is formed on the pixel electrode. A first micro-cavity and a second micro-cavity are disposed between the pixel electrode and the roof layer. A liquid crystal fills the first and second micro-cavities. The first and second micro-cavities are connected to each other by a first path. The first penetrates the roof layer.

The substrate includes a plurality of pixel areas disposed in a matrix shape including a plurality of pixel rows and a plurality of pixel columns. The roof layer may be formed along a pixel row. The first and second micro-cavities are formed in a pixel TOW.

The substrate may include a first valley positioned between pixel rows adjacent to each other and a second valley positioned between pixel columns adjacent to each other. The first path may be formed in the second valley.

The display device includes a second path connecting the first and second micro-cavities to each other.

The roof layer may include a first injection hole exposing a portion of the first or second micro-cavity. The first injection hole may be formed in the first valley.

The roof layer may further include a second injection hole exposing at least a portion of the first path.

The first path may have a height that is substantially equal to or lower than a height of the first or second micro-cavity.

The first path may have a height that is gradually decreased from an edge of the first path to the center of the first path.

A column extends from the roof layer to a bottom surface of the first path through a middle portion of the path.

The display device further includes a first column and a second column. The first column extends from the roof layer to a bottom surface of the first path. The second column extends from the roof layer to a bottom surface of the second path.

A method of manufacturing a display device according to an exemplary embodiment of the present invention is provided. The method includes forming a thin film transistor on a substrate. The substrate includes a plurality of pixel areas disposed in a matrix shape including a plurality of pixel rows and a plurality of pixel columns. A pixel electrode is connected to the thin film transistor. The pixel electrode is formed on the substrate. A first sacrificial layer and a second sacrificial layer are formed on the pixel electrode. The first and second sacrificial layers are connected to each other through a first connection bridge. A roof layer is formed on the first and second sacrificial layers and the first connection bridge. A first injection hole is formed in the roof layer and exposes a portion of the sacrificial layer. The first and second sacrificial layers and the first connection bridge are removed forming a first micro-cavity and a second micro-cavity between the pixel electrode and the roof layer and a path connecting the first and second micro-cavities to each other. A liquid crystal is injected through the first injection hole into the first or second micro-cavity. An encapsulation layer is formed on the roof layer and seals the first and second micro-cavities.

The substrate includes a pixel row. The roof layer may be continuous along the pixel row.

The substrate may include a first valley positioned between pixel rows adjacent to each other and a second valley positioned between pixel columns adjacent to each other. The path may be formed in the second valley.

At least one second connection bridge may be formed between two adjacent pixel areas in substantially the same pixel row.

The first injection hole may be formed in the first valley.

A second injection hole is formed in the roof layer. The second injection hole exposes at least a portion of the first connection bridge may be formed in the roof layer. The liquid crystal may be injected into the first or second micro-cavity through the first injection hole and the second injection hole.

The first connection bridge may have a height that is equal to or lower than a height of the sacrificial layer.

The first connection bridge may have a height that is gradually decreased from an edge of the first connection bridge to the center of the first connection bridge.

A first hole may be further formed through a middle portion of the first connection bridge. A column extends from the roof layer and fills the first hole.

At least one second hole may be formed through the first connection bridge.

According to an exemplary embodiment of the present invention, a display device includes a substrate. A pixel electrode is formed on the substrate. A roof layer is formed on the pixel electrode. A first micro-cavity and a second micro-cavity are formed between the pixel electrode and the roof layer. The first and second micro-cavities are filled with a liquid crystal. A path connects the first micro-cavity with the second micro-cavity. A height of the path is substantially identical to or smaller than a height of the first micro-cavity or the second micro-cavity.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF EXEMPLARY EMBODIMENTS

Figure 1:
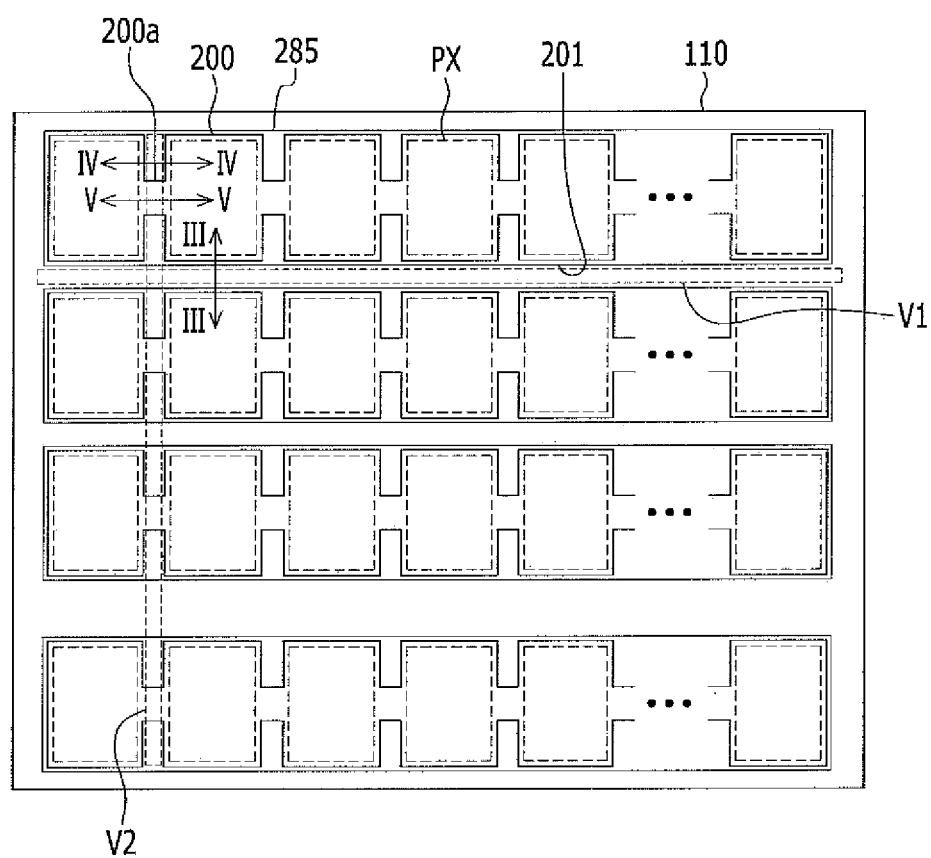
FIG. 1 is a top plan view of a display device according to an exemplary embodiment of the present invention.

Exemplary embodiment of the present invention will be described in more detail hereinafter with reference to the accompanying drawings. As those skilled in the art would realize, the described embodiments may be modified in various different ways.

In the drawings, the thickness of layers, films, panels, regions, etc., may be exaggerated for clarity. Like reference numerals may designate like or similar elements throughout the specification and the drawings. It will be understood that when an element is referred to as being "on," "connected to," or "coupled to" another element, it can be directly on, connected to or coupled to the other element or intervening elements may be present.

As used herein, the singular forms "a," "an," and "the" are intended to include the plural forms as well, unless the context clearly indicates otherwise.

Figure 2:
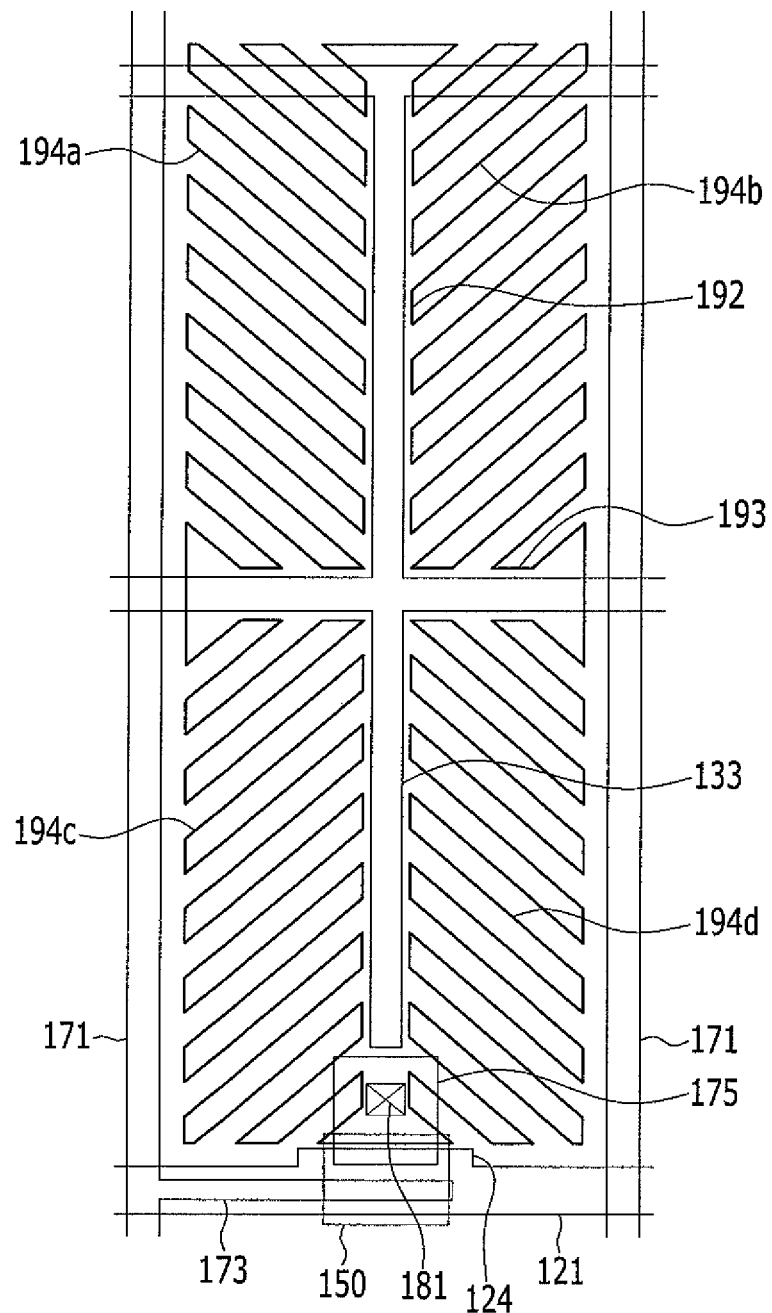
FIG. 2 is a top plan view of one pixel of a display device according to an exemplary embodiment of the present invention.
Figure 3:
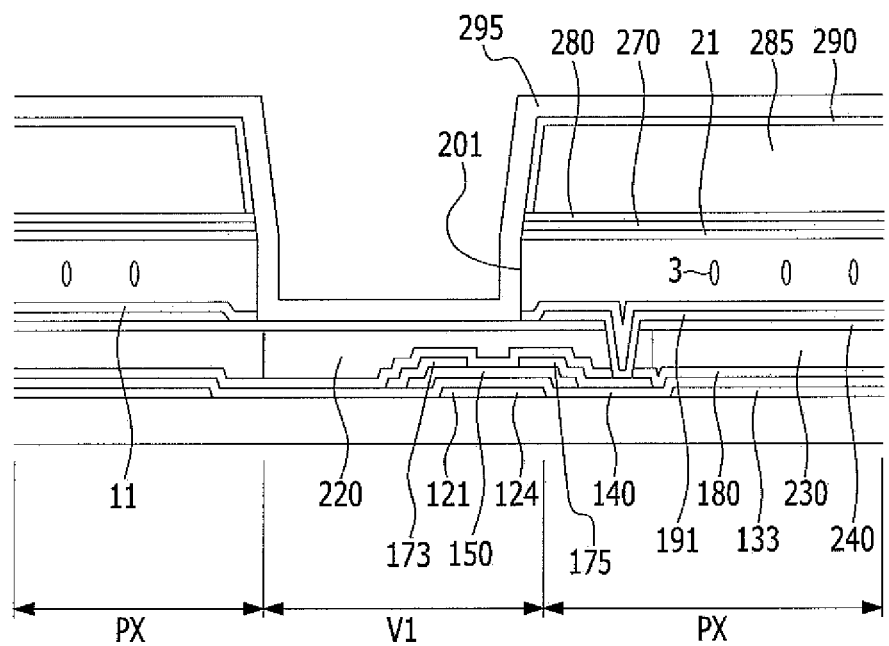
FIG. 3 is a partial cross-sectional view taken along line III-III of FIG. 1.
Figure 4:
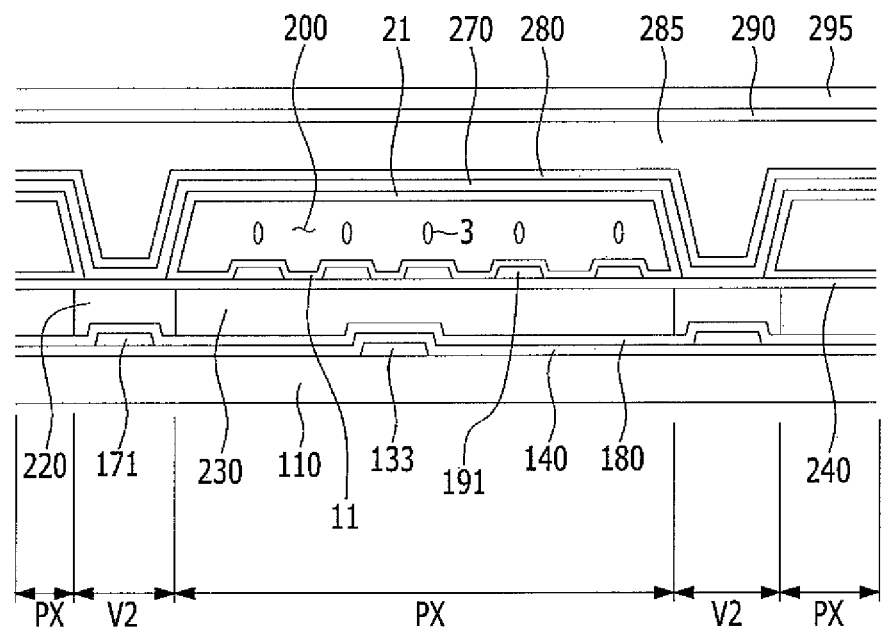
FIG. 4 is a partial cross-sectional view taken along line IV-IV of FIG. 1.
Figure 5:
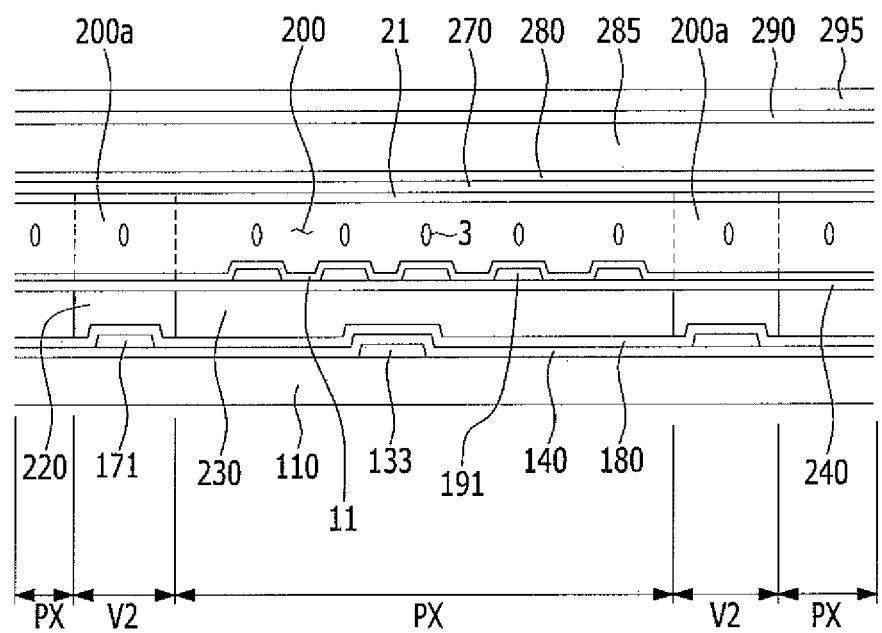
FIG. 5 is a partial cross-sectional view taken along line V-V of FIG. 1.

FIG. 1 is a top plan view of a display device according to an exemplary embodiment of the present invention, and FIG. 2 is a top plan view of one pixel of a display device according to an exemplary embodiment of the present invention. FIG. 3 is a partial cross-sectional view taken along line of FIG. 1, FIG. 4 is a partial cross-sectional view taken along line IV-IV of FIG. 1, and FIG. 5 is a partial cross-sectional view taken along line V-V of FIG. 1.

A display device according to an exemplary embodiment of the present invention includes a substrate 110 form of a material such as glass or plastic.

The substrate 110 includes a plurality of pixel areas PX. The plurality of pixel areas PX are disposed in a matrix shape including a plurality of pixel rows and a plurality of pixel columns. A first valley V1 is positioned between pixel rows adjacent to each other, and a second valley V2 is positioned between pixel columns adjacent to each other.

However, the arrangement of a plurality of pixel areas PX is not limited thereto and various changes may be made thereto.

On the substrate 110, a gate line 121 is formed in a first direction and a data line 171 is formed in a second direction. The second direction may be substantially perpendicular to the first direction. The gate line 121 may be formed in the first valley V1, and the data line 171 may be formed in the second valley V2. The gate line 121 and the data line 171 may cross each other. The pixel areas PX of the substrate 110 may be defined by the gate lines 121 and the data lines 171.

The gate lines 121 mainly extend in a transverse direction of the pixel areas PX. Gate signals are transmitted through the gate lines 121. A gate electrode 124 protrudes from the gate line 121. A gate signal is applied to the gate electrode 124 through the gate line 121.

A storage electrode 133 may be further formed in the pixel area. The storage electrode 133 is not connected with the gate line 121 and the gate electrode 124. As shown in FIG. 2, the storage electrode 133 may be formed in a direction substantially parallel with the gate line 121 and the data line 171. Alternatively, the storage electrode 133 may be formed only in a direction parallel with the gate line 121. A plurality of storage electrodes 133 are formed in adjacent pixel areas and are connected to each other. A predetermined voltage such as common voltage is applied to the storage electrode 133.

A gate insulating layer 140 is formed on the gate line 121, the gate electrode 124, and the storage electrode 133. The gate insulating layer 140 may be form of an inorganic insulating material such as silicon nitride (SiNx) and silicon oxide (SiOx). Further, the gate insulating layer 140 may be formed in a single layer or a multilayer.

A semiconductor layer 150 is formed on the gate insulating layer 140. The semiconductor layer 150 may be positioned on the gate electrode 124. As illustrated in FIG. 2, the semiconductor layer 150 may extend to a position below the gate line 121. The semiconductor layer 150 may be form of amorphous silicon, polycrystalline silicon, a metal oxide, and the like.

On the semiconductor layer 150, a source electrode 173 protruding from the data line 171 and a drain electrode 175 spaced apart from the source electrode 173 are formed.

The data lines 171 extend substantially in a longitudinal direction of the pixel areas PX. A data signals is transmitted through the data line 171 to the source electrode 173.

The gate electrode 124, the semiconductor layer 150, the source electrode 173, and the drain electrode 175 may configure a thin film transistor. When the thin film transistor is turned on, a data signal applied to the source electrode 173 is transferred to the drain electrode 175.

A passivation layer 180 is formed on the data line 171, the source electrode 173, the drain electrode 175, and the semiconductor layer 150 exposed between the source and drain electrodes 173 and 175. The passivation layer 180 may be form of an organic insulating material or an inorganic insulating material and may be formed in a single layer or a multilayer.

A color filter 230 is formed in each pixel area on the passivation layer 180. Each color filter 230 may display a primary color such as red, green, or blue. The color filter 230 is not limited to the three primary colors of red, green, and blue and may also display cyan, magenta, yellow, and white-based colors.

A light blocking member 220 is formed in a region between color filters 230 adjacent to each other. The light blocking member 220 is formed on a boundary of the pixel area and the thin film transistor, thus preventing light leakage. For example; the light blocking member 220 may be formed in the first valley V1 and the second valley V2.

A first insulating layer 240 may be further formed on the color filter 230 and the light blocking member 220. The first insulating layer 240 may be form of an inorganic insulating material such as silicon nitride (SiNx) and silicon oxide (SiOx). The first insulating layer 240 protects the color filter and the light blocking member 220. Alternatively, the first insulating layer 240 may be omitted.

A contact hole 181 is formed through the first insulating layer 240, the light blocking member 220, and the passivation layer 180 and exposes a part of the drain electrode 175. The contact hole 181 may also be formed through the color filter 230 instead of the light blocking member 220.

A pixel electrode 191 connected with the drain electrode 175 through the contact hole 181 is formed on the first insulating layer 240. The pixel electrode 191 is formed in each pixel area and is connected with the drain electrode 175. The pixel electrode 191 receives a data signal from the drain electrode 175 when the thin film transistor is turned on. The pixel electrode 191 may be form of a transparent metal or a metal oxide such as indium tin oxide (ITO) and indium zinc oxide (IZO).

The pixel electrode 191 includes a transverse stem 193, a longitudinal stem 192 substantially orthogonal to the transverse stem 193, and a plurality of first to fourth minute branches 194a, 194b, 194c, and 194d.

The transverse stem 193 may be formed in a direction substantially parallel with the gate line 121, and the longitudinal stem 192 may be formed in a direction substantially parallel with the data line 171. The transverse stem 193 may be formed substantially in the middle between two adjacent gate lines 121, and the longitudinal stem 192 may be formed substantially in the middle between two adjacent data lines 171.

One pixel area is divided into a first sub-pixel area, a second sub-pixel area, a third sub-pixel area, and a fourth sub-pixel area by the transverse stem 193 and the longitudinal stem 192. The first sub-pixel area is positioned at the upper side of the transverse stem 193 and the left side of the longitudinal stem 192, and the second sub-pixel area is positioned at the upper side of the transverse stem 193 and the right side of the longitudinal stem 192. The third sub-pixel area is positioned at the lower side of the transverse stem 193 and the left side of the longitudinal stem 192, and the fourth sub-pixel area is positioned at the lower side of the transverse stem 193 and the right side of the longitudinal stem 192. The first minute branches 194a are formed in the first sub-pixel area, and the second minute branches 194b are formed in the second sub-pixel area. The third minute branches 194c are formed in the third sub-pixel area, and the fourth minute branches 194d are formed in the fourth sub-pixel area.

The first minute branches 194a extend obliquely in an upper and left direction from the transverse stem 193 or the longitudinal stem 192, and the second minute branches 194b extend obliquely in an upper and right direction from the transverse stem 193 or the longitudinal stem 192. The third minute branches 194c extend obliquely in a lower and left direction from the transverse stem 193 or the longitudinal stem 192, and the fourth minute branches 194d extend obliquely in a lower and right direction from the transverse stem 193 or the longitudinal stem 192.

The first to fourth minute branches 194a to 194d may form an angle of substantially 45 degrees or substantially 135 degrees with respect to the gate line 121 or the transverse stem 193. The first to fourth minute branches 194a to 194d of the adjacent sub-pixel areas may be formed to be substantially perpendicular to each other.

The shape of the pixel electrode 191 is not limited to that shown in FIG. 1 and may be variously modified. Further, one pixel area is divided into four sub-pixel areas but may be divided into more than four areas or may not be divided into a plurality of sub-pixel areas.

A common electrode 270 is formed on the pixel electrode 191 while spaced apart from the pixel electrode 191 by a predetermined distance. A micro-cavity 200 is formed between the pixel electrode 191 and the common electrode 270. The width and the area of the micro-cavity 200 may be variously changed according to the resolution of the display device.

A liquid crystal 3 is filled in the micro-cavity 200. The liquid crystal 3 includes a plurality of liquid crystal molecules and may be erected in a direction substantially perpendicular to the substrate 110 when an electric field is not applied. For example, vertical alignment may be formed. However, exemplary embodiments of the present invention are not limited thereto, and horizontal alignment may also be formed.

The liquid crystal 3 may include nematic, smectic, cholesteric, and/or chiral liquid crystal materials. The liquid crystal 3 may include a negative liquid crystal material or a positive liquid crystal material.

The pixel electrode 191 is formed below the micro-cavity 200, and the common electrode 270 is formed above the micro-cavity 200. However, exemplary embodiments of the present invention are not limited thereto. Alternatively, both the pixel electrode 191 and the common electrode 270 may also be formed below the micro-cavity 200. In this case, the pixel electrode 191 and the common electrode 270 may be formed on substantially the same layer or may be formed on different layers with an insulating layer therebetween. The liquid crystal molecules of the liquid crystal 3 may lie in a direction substantially parallel with the substrate 110.

A first alignment layer 11 is formed on the pixel electrode 191. The first alignment layer 11 may be formed on the first insulating layer 240 that is not covered by the pixel electrode 191.

A second alignment layer 21 is formed below the common electrode 270. The second alignment layer 21 faces the first alignment layer 11.

The first alignment layer 11 and the second alignment layer 21 may be formed as vertical alignment layers. The first and second alignment layers 11 and 21 may be formed of a material such as polyamic acid, polysiloxane, and polyimide. The first and second alignment layers 11 and 12 may be connected with each other at an edge of the pixel area.

The micro-cavity 200 is surrounded by the pixel electrode 191 and the common electrode 270.

The common electrode 270 directly contacts the first insulating layer 240 in the second valley V2 and covers a left surface and a right surface of the micro-cavity 200. The common electrode 270 is continuous along a plurality of pixel rows. The height of the common electrode 270 positioned in the second valley V2 is lower than the height of the common electrode positioned in the pixel area PX since the micro-cavity 200 is not formed in the second valley V2.

The common electrode 270 is not formed in at least a part of the first valley V1. For example, the common electrode 270 does not cover at least a portion of the upper surface and the lower surface of the pixel area PX and exposes the portion of the micro-cavity 200 to the outside. A surface where the micro-cavity 200 is exposed is referred to as a first injection hole 201. The first injection hole 201 is formed along the first valley V1, and the liquid crystal 3 is injected into the micro-cavity 200 through the first injection hole 201.

The common electrode 270 covers the right surface and the left surface of the micro-cavity 200 and does not cover at least a portion of the upper surface and the lower surface. However, exemplary embodiments of the present invention are not limited thereto. For example, the common electrode 270 may cover the upper surface and the lower surface of the micro-cavity 200 but not at least a portion of the right surface and the left surface. In this case, the first injection hole 201 may be formed along the second valley V2.

A second insulating layer 280 may be further formed on the common electrode 270. The second insulating layer 280 may be formed of an inorganic insulating material such as silicon nitride (SiNx) and silicon oxide (SiOx). Alternatively, the second insulating layer 280 may be omitted.

A roof layer 285 is formed on the second insulating layer 280. The roof layer 285 may be formed of an organic material. The micro-cavity 200 is formed under the roof layer 285. The shape of the micro-cavity 200 may be maintained by the roof layer 285.

The roof layer 285 is continuous along a plurality of pixel rows. The first injection hole 201 is formed along the first valley V1 in the roof layer 285 and exposes a portion of the micro-cavity 200 to the outside.

The micro-cavity 200 is formed per pixel area PX between the pixel electrode 191 and the roof layer 285. Micro-cavities 200 positioned in different pixel areas PX may be connected to each other. A path 200a penetrates the roof layer 285 and is formed on the boundary of the pixel area PX. The micro-cavities 200 positioned in the different pixel areas PX may be connected to each other by the path 200a.

The micro-cavities 200 formed in the same pixel row may be connected to each other by the path 200a. For example, a first micro-cavity 200 and a second micro-cavity 200 adjacent to the first micro-cavity 200 in a first pixel row are connected to each other by a path 200a. The second micro-cavity 200 and a third micro-cavity 200 adjacent to the second micro-cavity 200 in the first pixel row are connected to each other by a path 200a. The third micro-cavity 200 and a fourth micro-cavity adjacent to the third micro-cavity 200 in the first pixel area are connected to each other through a path 200a, and the fourth micro-cavity 200 and a fifth micro-cavity 200 adjacent to the fourth micro-cavity 200 in the first pixel area are connected to each other through a path 200a. Thus, the micro-cavities 200 formed in the first pixel row may be connected to each other. Likewise, the micro-cavities 200 formed in a second pixel row may be connected to each other through paths 200, and the micro-cavities 200 formed in a third pixel row may be connected to each other trough paths 200.

The path 200a connecting the micro-cavities 200 to each other may be formed in the second valley V2.

The roof layer 285 covers the left surface and the right surface of the micro-cavities 200. The path 200a penetrates the roof layer 285 at the left surface and the right surface of the micro-cavity 200, and thus, the side surface of the micro-cavity 200 is not covered in the portion where the path 200a is formed. In the portion where the path 200a is formed, the common electrode 270 and the second insulating layer 280 as well as the roof layer 285 are formed on the path 200a.

The liquid crystal 3 may be formed of a flowable material and may be positioned in the path 200a.

A third insulating layer 290 may be further formed on the roof layer 285. The third insulating layer 290 may be form of an inorganic insulating material such as silicon nitride (SiNx) or silicon oxide (SiOx). The third insulating layer 290 may cover the upper surface and the side surface of the roof layer 285. The third insulating layer 290 protects the roof layer 285. Alternatively, the third insulating layer 290 may be omitted.

An encapsulation layer 295 may be formed on the third insulating layer 290. The encapsulation layer 295 covers the first injection hole 201 that exposes the micro-cavity 200 to the outside. The encapsulation layer 295 may seal the micro-cavity 200 and prevents the liquid crystal 3 from leaking from the micro-cavity. The encapsulation layer 295 contacts the liquid crystal 3. The encapsulation layer 295 may be formed of a material which does not react with the liquid crystal 3.

FIG. 6 to FIG. 23 are cross-sectional views of a method of manufacturing a display device according to an exemplary embodiment of the present invention. FIG. 6, FIG. 8, FIG. 10, FIG. 12, FIG. 14, FIG. 16, FIG. 18, FIG. 20, and FIG. 22 are cross-sectional views taken along a line, and FIG. 7, FIG. 9, FIG. 11, FIG. 13, FIG. 15, FIG. 17, FIG. 19, FIG. 21, and FIG. 23 are cross-sectional views taken along another line.

Figure 6:
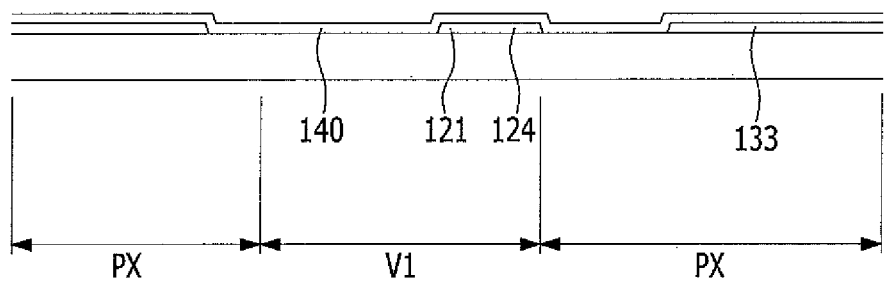
FIG. 6 to FIG. 23 are cross-sectional views of a method of manufacturing a display device according to an exemplary embodiment of the present invention.
Figure 7:
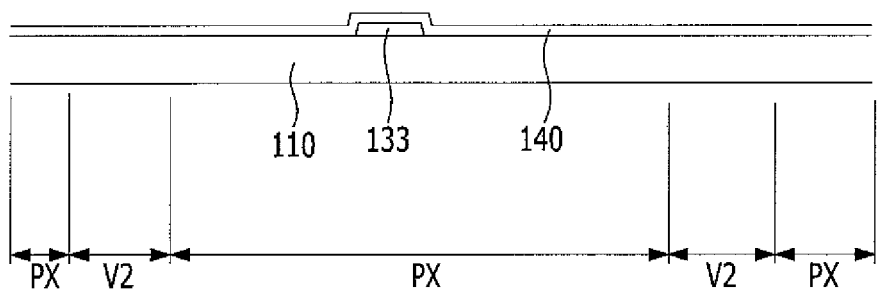

As shown in FIG. 6 and FIG. 7, a gate line 121 extending in a first direction and a gate electrode 124 protruding from the gate line 121 are formed of glass or plastic on a substrate 110. A storage electrode 133 separated from the gate line 121 and the gate electrode 124 is formed on the substrate 110. The storage electrode 133 may be formed of substantially the same material as the gate line 121 and the gate electrode 124.

A gate insulating layer 140 is formed of an inorganic insulating material such as silicon oxide or silicon nitride on an entire surface of the substrate 110 including the gate line 121, the gate electrode 124, and the storage electrode 133. The gate insulating layer 140 may be formed in a single layer or a multilayer.

Figure 8:
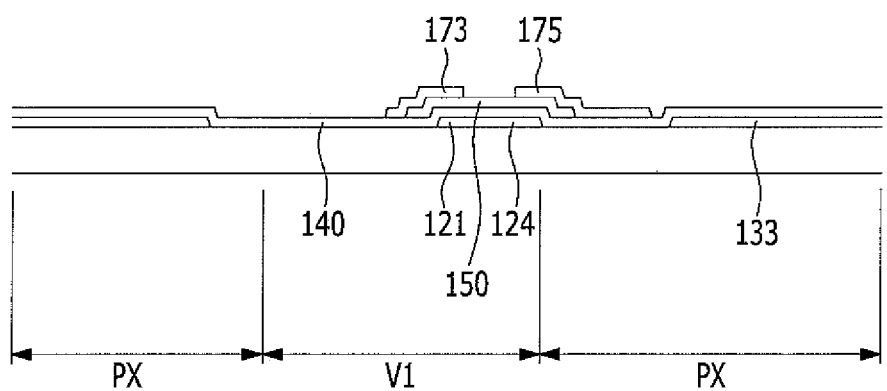
Figure 9:
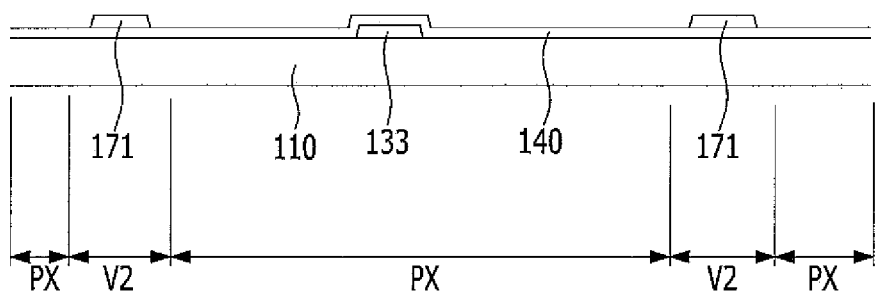

As shown in FIG. 8 and FIG. 9, a semiconductor material, such as amorphous silicon, polycrystalline silicon, and a metal oxide, is deposited on the gate insulating layer 140 and is patterned, thus forming a semiconductor layer 150. The semiconductor layer 150 may be positioned on the gate electrode 124.

A metal material is deposited and patterned, forming a data line 171. The data line extends in a second direction different from the first direction of the gate line 121. The first and second direction may be substantially perpendicular to each other. A source electrode 173 protruding from the data line 171 on the semiconductor layer 150 and a drain electrode 175 separated from the source electrode 173 are formed. The metal material may be formed in a single layer or a multilayer.

The semiconductor material and the metal material may be sequentially deposited and may be substantially simultaneously patterned, thus forming the semiconductor layer 150, the data line 171, the source electrode 173, and the drain electrode 175. The semiconductor layer 150 is extended to a position under the data line 171.

The gate electrode 124, the semiconductor layer 150, the source electrode 173, and the drain electrode 175 form a thin film transistor. The gate line 121 and the data line 171 may cross each other. A plurality of pixel areas PX may be defined by the gate line 121 and the data line 171.

Figure 10:
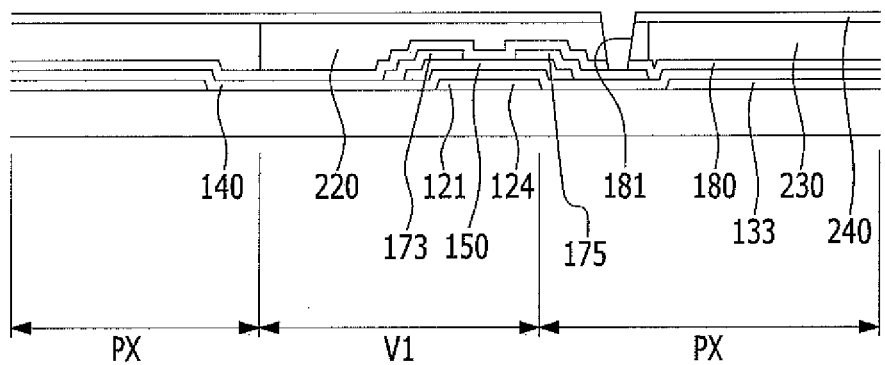
Figure 11:
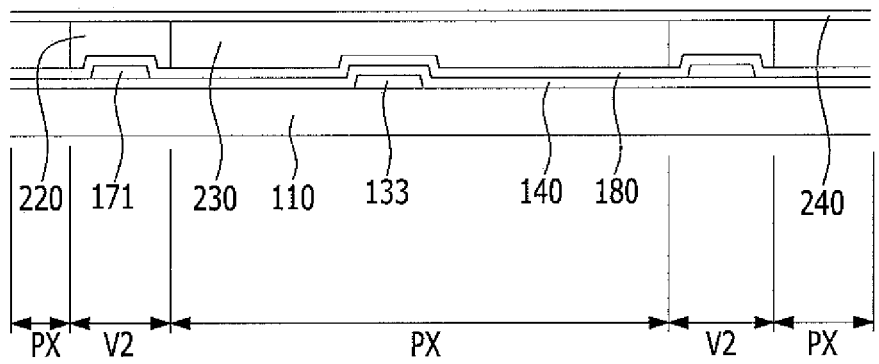

As shown in FIGS. 10 and 11, a passivation layer 180 is formed on the data line 171, the source electrode 173, the drain electrode 175, and the semiconductor layer 150 exposed between the source electrode 173 and the drain electrode 173. The passivation layer 180 may be formed of an organic insulating material or an inorganic insulating material. The passivation layer 180 may be formed in a single layer or a multilayer.

A color filter 230 is formed in each pixel area PX on the passivation layer 180. Color filters 230 of substantially the same color may be formed along the column direction of a plurality of pixel areas PX. For example, when forming color filters 230 of three colors including a first, second, and third color, the color filter 230 of the first color is formed, and a mask is then shifted, and the color filter 230 of the second color is formed. After forming the color filter 230 of the second color, the mask is shifted, and the color filter 230 of the third color is formed.

A light blocking member 220 is formed on the thin film transistor and the boundary of each pixel area PX on the passivation layer 180.

After forming the color filter 230, the light blocking member 220 is formed, for example. However, exemplary embodiments of the present invention are not limited thereto, and the color filter 230 may be formed after forming the light blocking member 220.

The first insulating layer 240 is formed of an inorganic insulating material such as silicon nitride (SiNx) and silicon oxide (SiOx) on the color filter 230 and the light blocking member 220.

The first insulating layer 240, the light blocking member 220, and the passivation layer 180 are etched to form a contact hole 181 exposing a portion of the drain electrode 175.

Figure 12:
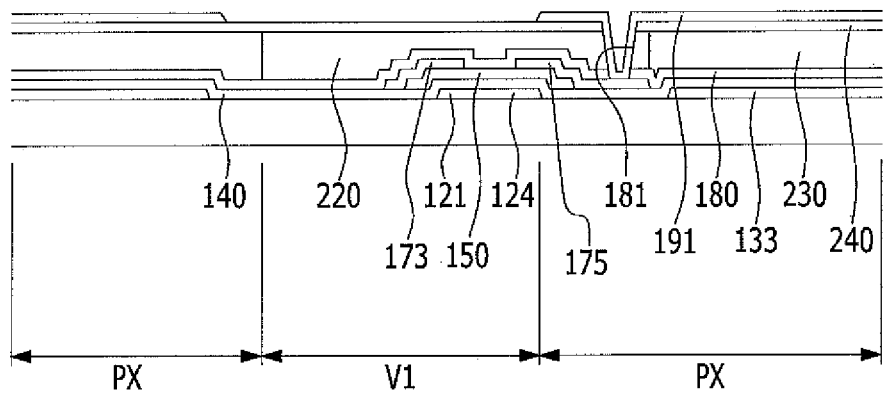
Figure 13:
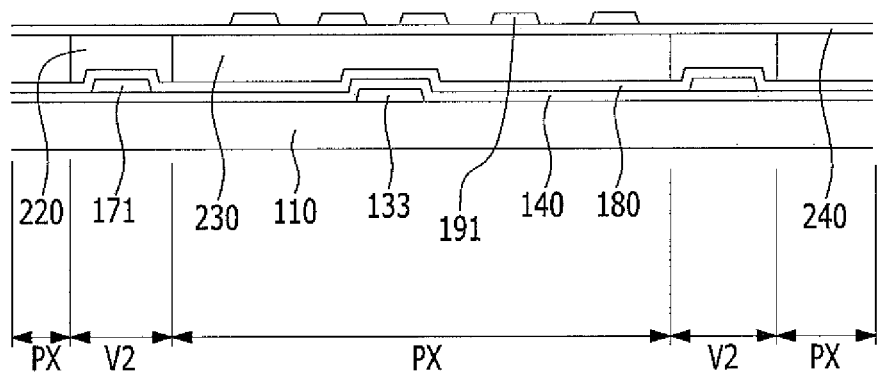

As shown in FIG. 12 and FIG. 13, a transparent metal material such as indium-tin oxide (ITO) and indium-zinc oxide (IZO) is deposited and patterned on the first insulating layer 240, thus forming a pixel electrode 191 in the pixel area PX. The pixel electrode 191 is connected to the drain electrode 175 through the contact hole 181.

Figure 14:
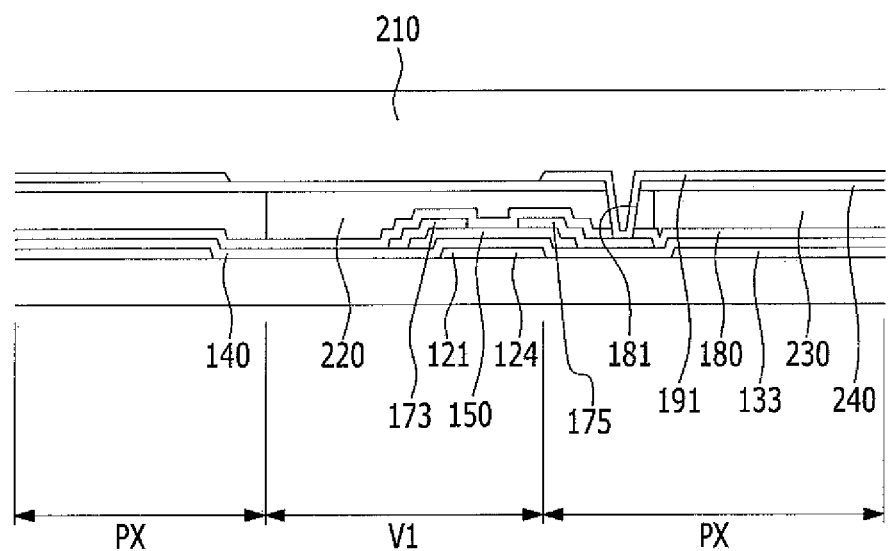
Figure 15:
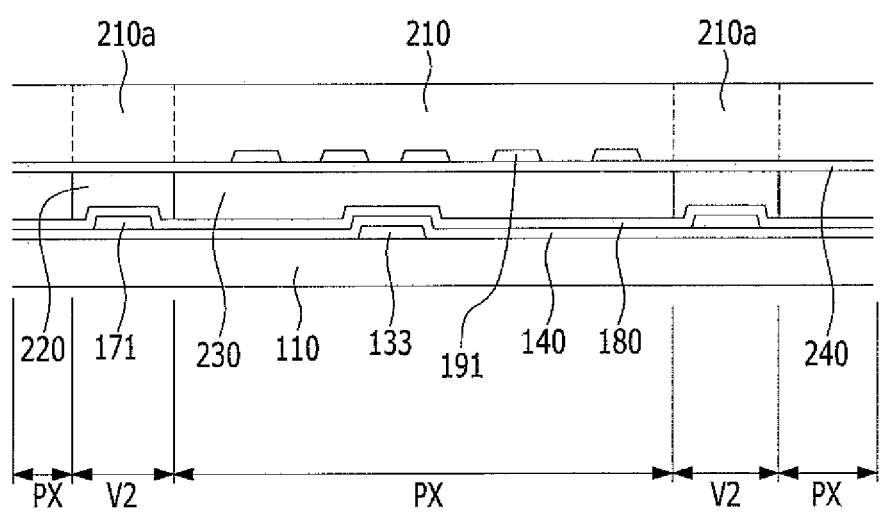

As shown in FIG. 14 and FIG. 15, a sacrificial layer 210 is formed of an organic insulating material on the pixel electrode 191 and the first insulating layer 240. The sacrificial layer 210 is continuous along a plurality of pixel columns. For example, the sacrificial layer 210 covers the first valley V1 positioned between the adjacent pixel areas PX.

A connection bridge 210a is formed connecting the sacrificial layers 210 positioned in the different pixel columns with each other. The connection bridge 210a may be formed between two adjacent pixel areas PX positioned in substantially the same pixel row. Accordingly, the connection bridge 210a may be formed in the second valley V2.

For example, the sacrificial layer 210 is formed in pixel areas PX of a first pixel column and in the first valley V1 positioned between pixel areas PX adjacent to each other in the first pixel column. The sacrificial layer 210 is also formed in pixel areas PX of a second pixel column and in the first valley V1 positioned between pixel areas PX adjacent to each other in the second pixel column. Likewise, the sacrificial layer 210 is formed along a third pixel column and a fourth pixel column.

The connection bridge 210a is formed between the sacrificial layer 210 formed along the first pixel column and the sacrificial layer 210 along the second pixel column. One connection bridge 210a is formed between two adjacent pixel areas PX included in a first pixel row. Another connection bridge 210a is formed between two adjacent pixel areas PX included in a second pixel row.

In this way, the sacrificial layers 210 are formed along the pixel columns, and the sacrificial layers 210 positioned in pixel columns different from each other are connected to each other by the connection bridge 210a. One connection bridge 210a is formed between two adjacent pixel areas positioned in substantially the same pixel row.

In a photo-process for forming the sacrificial layer 210 and the connection bridge 210a, a photosensitive organic material is removed from part of the second valley V2. For example, the photosensitive organic material is removed except for the portion where the connection bridge 210a is formed in the second valley V2.

Figure 16:
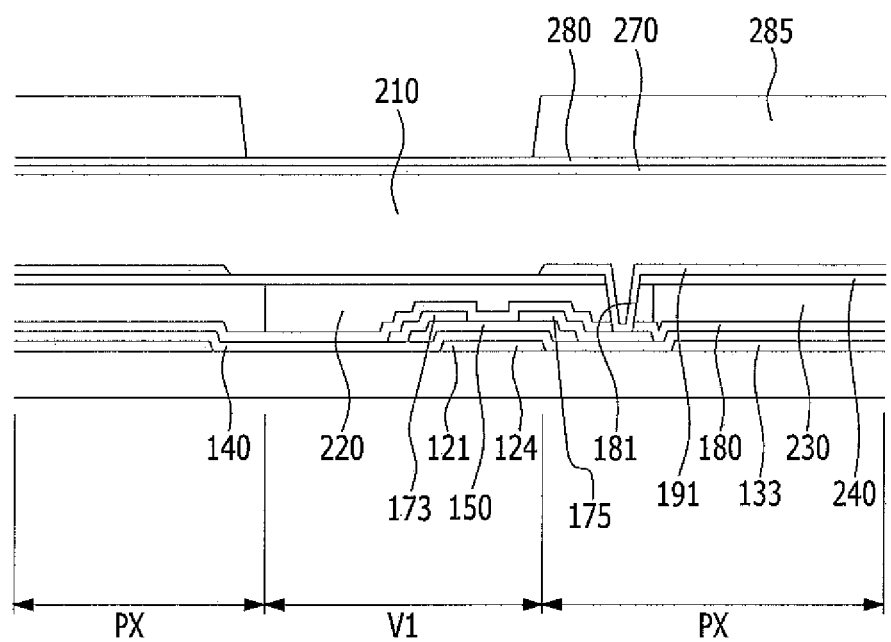
Figure 17:
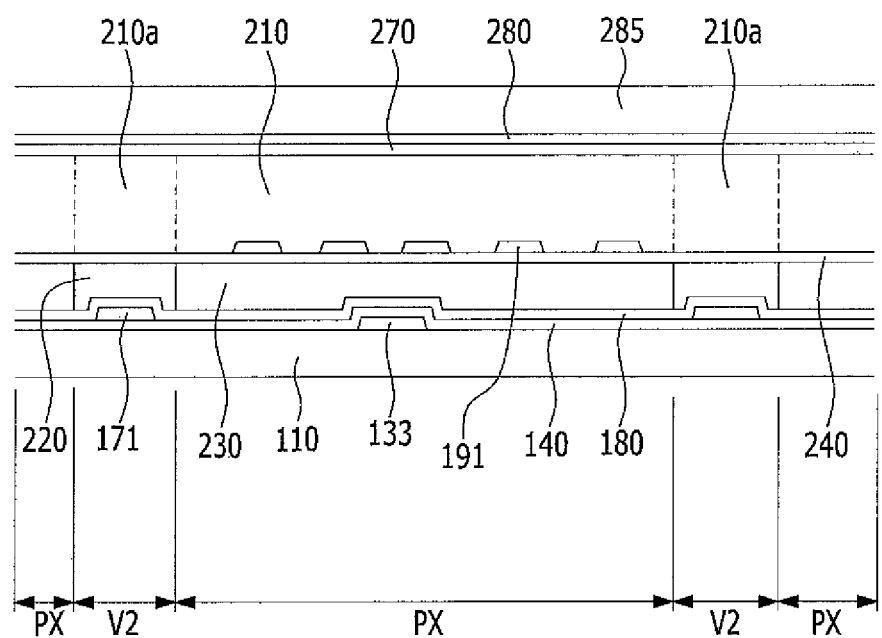

As shown in FIG. 16 and FIG. 17, a metal material is deposited on the sacrificial layer 210, thus forming a common electrode 270.

The second insulating layer 280 may be formed of an inorganic insulating material such as silicon oxide or silicon nitride on the common electrode 270.

A roof layer 285 is of an organic material on the second insulating layer 280. The roof layer 285 may be patterned, and thus, the roof layer 285 positioned in the first valley V1 is removed.

Figure 18:
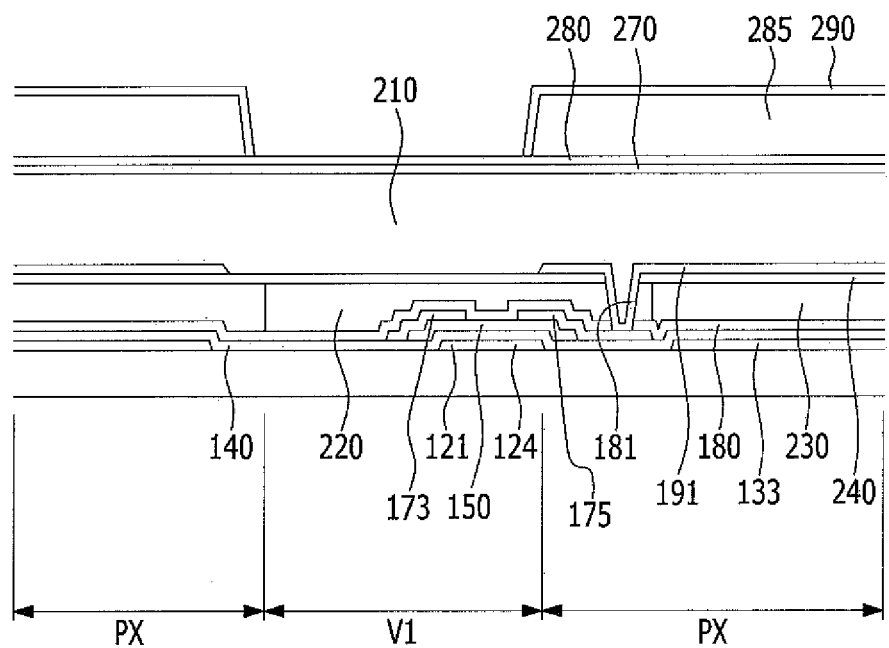
Figure 19:
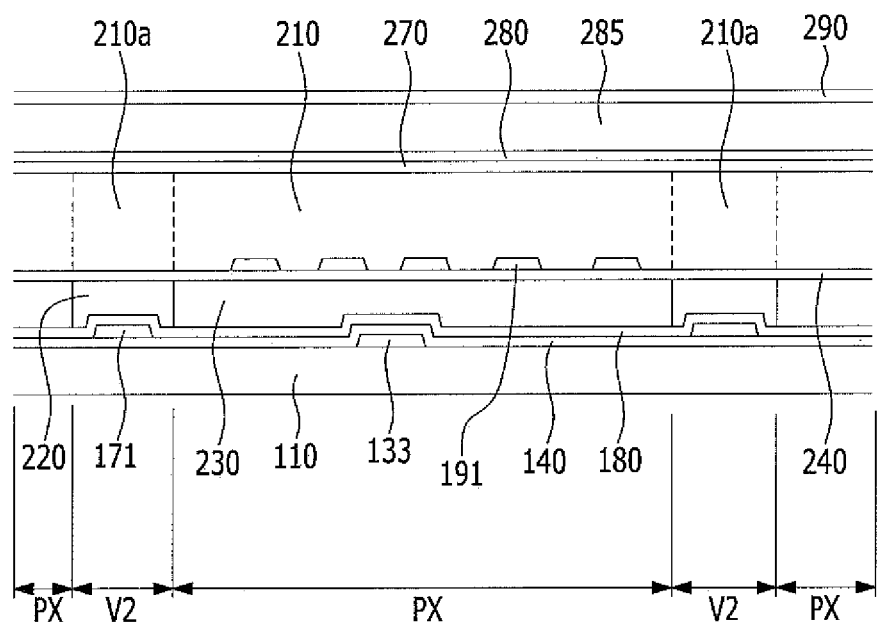

As shown in FIG. 18 and FIG. 19, the third insulating layer 290 may be formed of an inorganic insulating material such as silicon nitride (SiNx) or silicon oxide (SiOx) on the roof layer 285. The third insulating layer 290 is formed on the patterned roof layer 285. The third insulating layer 290 covers and protects the side surface of the roof layer 285.

Figure 20:
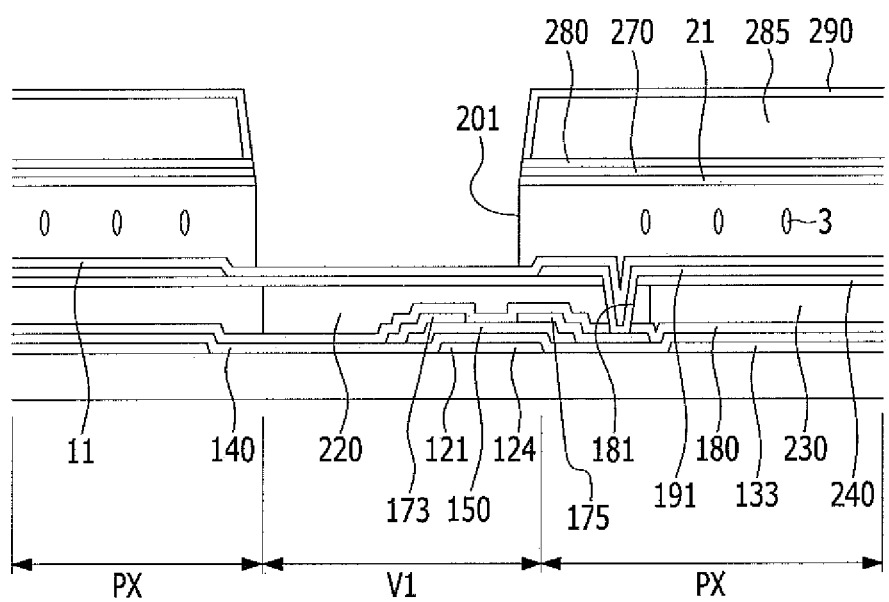
Figure 21:
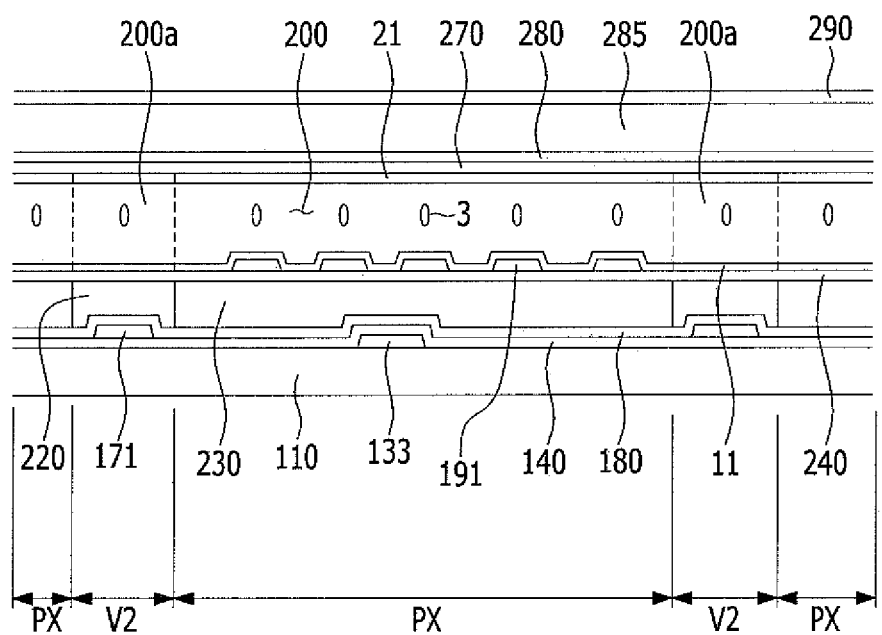

As shown in FIG. 20 and FIG. 21, the third insulating layer 290, the second insulating layer 280, and the common electrode 270 are patterned, and the third insulating layer 290, the second insulating layer 280, and the common electrode 270 positioned on the first valley V1 are removed. Accordingly, the sacrificial layer 210 positioned under a portion where the common electrode 270 is removed is exposed.

A developer is applied on the substrate 110 exposed by the sacrificial layer 210 and removes the sacrificial layer 210 and the connection bridge 210a. Oxygen plasma is supplied to the remaining sacrificial layer 210 and the remaining connection bridge 210a and performs asking on the remaining sacrificial layer 210 and the remaining connection bridge 210a. When the sacrificial layer 210 and the connection bridge 210a are removed, the micro-cavity 200 is formed in the space where the sacrificial layer 210 was removed, and the path 200a is formed in the space where the connection bridge 210a was removed.

The micro-cavity 200 is formed in each pixel area PX. Micro-cavities 200 positioned in different pixel areas PX from each other are connected to each other by the path 200a. Micro-cavities 200 formed in different pixel areas PX from each other in substantially the same pixel row may be connected to each other by the path 200a. The path 200a connecting the micro-cavities 200 to each other may be formed in the second valley V2.

The pixel electrode 191 and the common electrode 270 are separated from each other with the micro-cavity 200 interposed between the pixel electrode 191 and the common electrode 270. The pixel electrode 191 and the roof layer 285 are separated from each other with the micro-cavity 200 interposed between the pixel electrode 191 and the roof layer 285. The common electrode 270 and the roof layer 285 cover the upper surface and two opposite side surfaces of the micro-cavity 200.

The micro-cavity 200 is exposed to the outside through a portion where the common electrode 270 and the roof layer 285 are not formed, and the exposed portion is referred to as a first injection hole 201. The first injection hole 201 is formed along the first valley V1. Alternately, the first injection hole 201 may be formed along the second valley V2.

The substrate 110 is heated and thus the roof layer 285 is hardened. Accordingly, the shape of the micro-cavity 200 may be maintained by the roof layer 285.

An aligning agent including an alignment material is deposited on the substrate 110 by a spin coating method or an inkjet method. The aligning agent is injected into the micro-cavity 200 through the first injection hole 201. After injecting the aligning agent into the micro-cavity 200, a hardening process is performed to evaporate a solution component of the aligning agent and to leave the alignment material on the inner wall of the micro-cavity 200.

Accordingly, the first alignment layer 11 may be formed on the pixel electrode 191, and the second alignment layer 21 may be formed under the common electrode 270. The first alignment layer 11 and the second alignment layer 21 face each other with the micro-cavity 200 positioned between the first and second alignment layers 11 and 21. The first and second alignment layers 11 and 21 are connected to each other at an edge of the pixel area. The common electrode 270 forms a side wall covering the side surface of the micro-cavity 200 in the direction substantially parallel to the data line 171 in a portion adjacent to the data line 171, and the alignment material remains on the inner surface of the side wall.

The first and second alignment layers 11 and 21 may perform alignment in a direction substantially perpendicular to the first substrate 110 except for the side surface of the micro-cavity 200. Ultraviolet rays may be irradiated to the first and second alignment layers 11 and 21, the alignment may be performed in a direction substantially parallel to the substrate 110.

A liquid crystal 3 including liquid crystal molecules is dripped on the substrate 110 by an inkjet method or a dispensing method. The liquid crystal 3 is injected into the micro-cavity 200 through the first injection hole 201. The liquid crystal 3 may be dripped to first injection holes 201 formed along odd-numbered first valleys V1 but not to first injection holes 201 formed along even-numbered first valleys V1. Alternatively, the liquid crystal 3 may be dripped to the first injection holes 201 formed along the even-numbered first valleys V1 but not to the first injection holes 201 formed along the odd-numbered first valleys V1.

When the liquid crystal 3 is dripped to the first injection holes 201 formed along the odd-numbered first valleys V1, the liquid crystal 3 is injected into the micro-cavity 200 through the first injection holes 201 by a capillary force. Air in the micro-cavities 200 is exhausted through the first injection holes 201 formed along the even-numbered first valley V1, and thus, the liquid crystal 3 may be easily injected into the micro-cavities 200.

The liquid crystal 3 may be dripped to all of first injection holes 201. For example, the liquid crystal 3 may be dripped to the first injection holes 201 formed along the odd-numbered first valleys V1 and the first injection holes 201 formed along the even-numbered first valleys V1.

Figure 22:
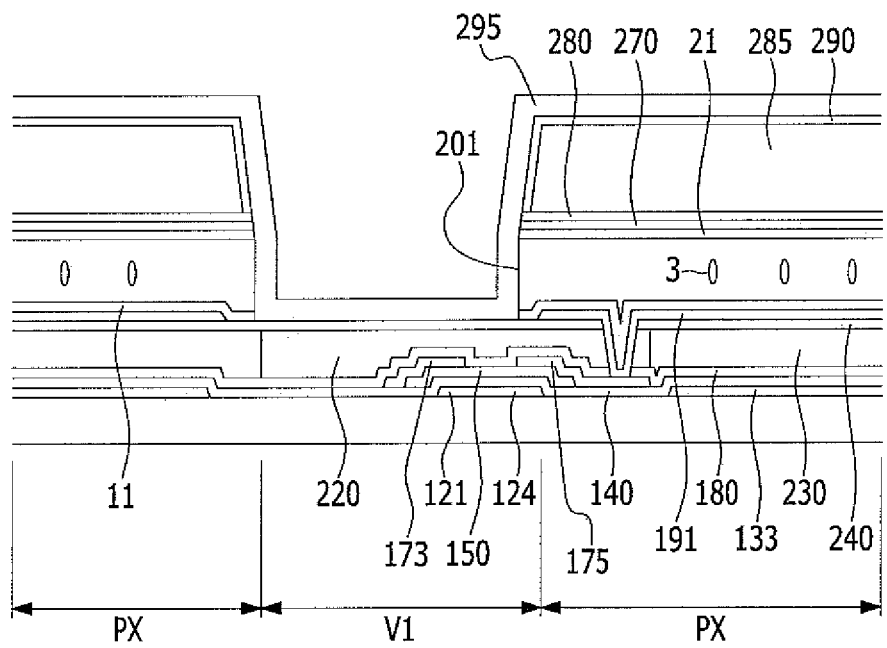
Figure 23:
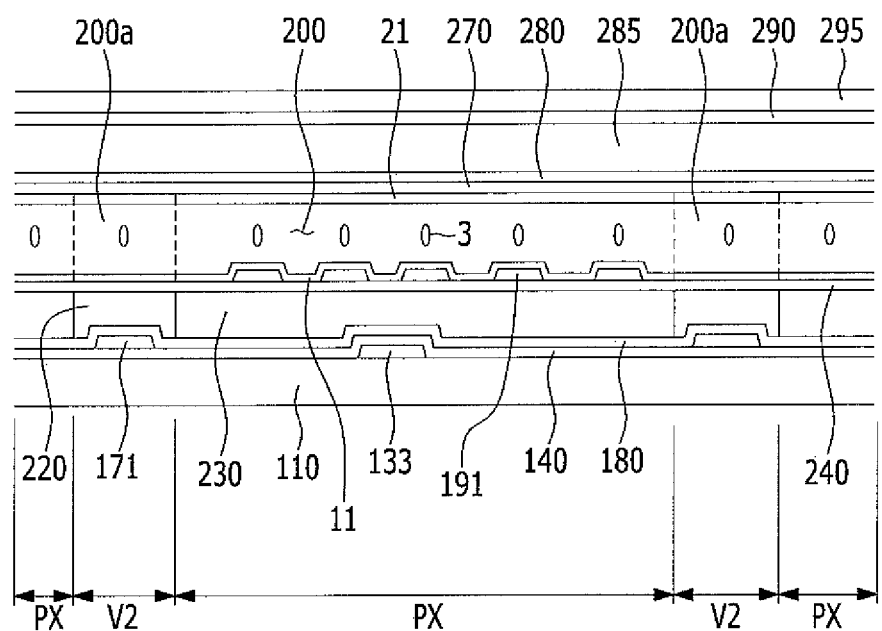

As shown in FIG. 22 and FIG. 23, an encapsulation layer 295 is formed by depositing a material, which does not react with the liquid crystal 3, on the third insulating layer 290. The encapsulation layer 295 is formed such that the micro-cavity 200 covers the first injection hole 201 and seals the micro-cavity 200.

Two first injection holes 201 are formed in each pixel area PX and are covered by the encapsulation layer 295. Accordingly, the micro-cavities 200 positioned in different pixel rows from each other are not connected to each other. After the encapsulation layer 295 is formed, the micro-cavities 200 positioned in substantially the same pixel row are connected to each other by the path 200a.

Accordingly, even when different amounts of the liquid crystal 3 are injected into two adjacent pixel areas PX, respectively, the liquid crystal 3 may be moved through the path 200a, and thus, the difference in the amount of the liquid crystal 3 between the pixel areas PX may be decreased.

Figure 24:
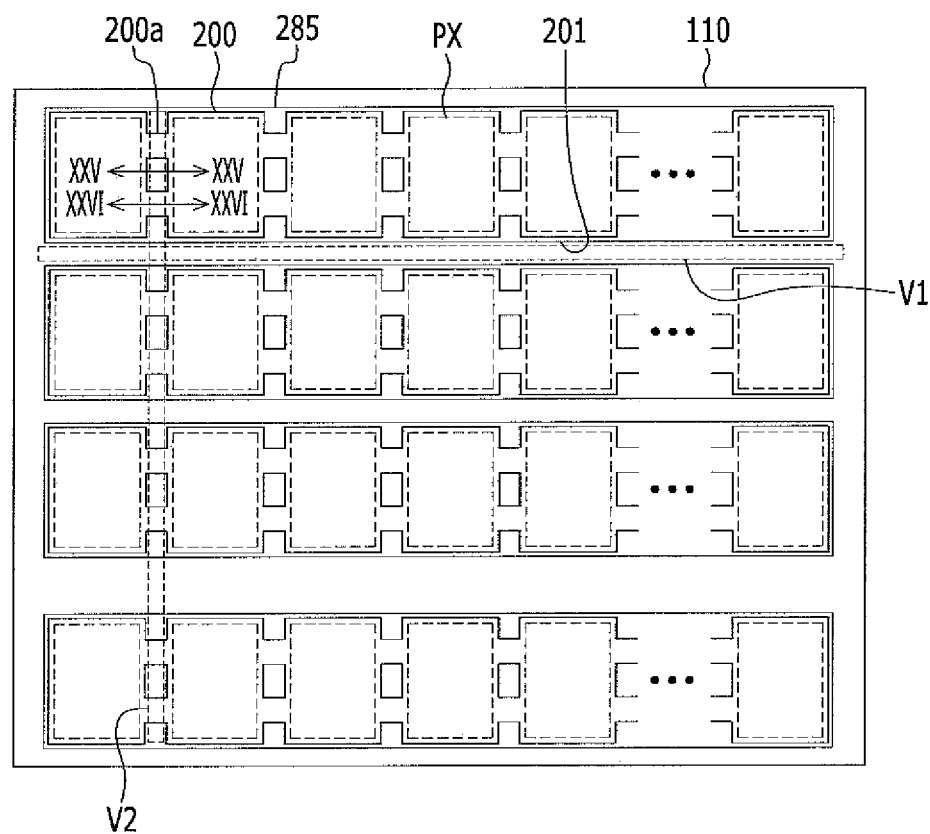
FIG. 24 is a top plan view of a display device according to an exemplary embodiment of the present invention.
Figure 25:
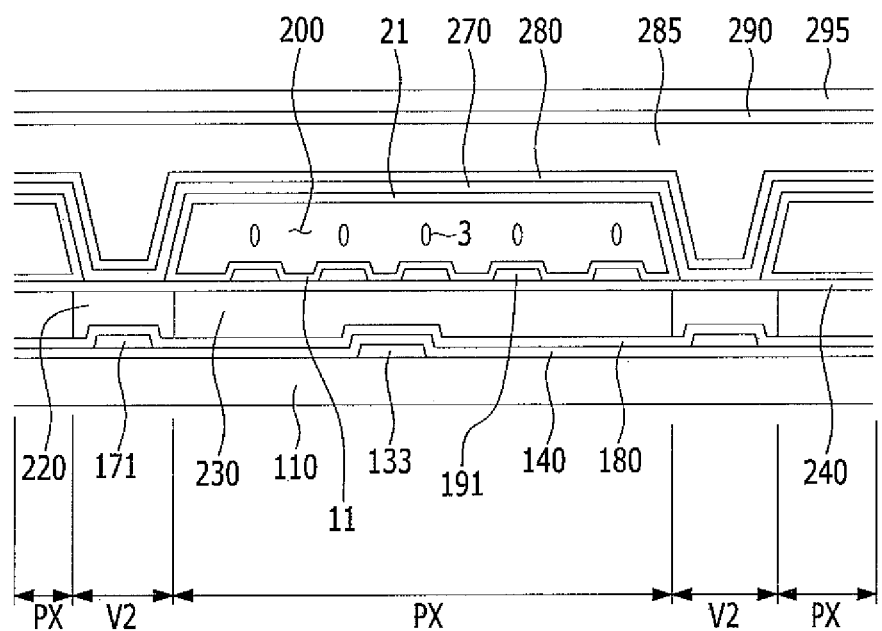
FIG. 25 is a partial cross-sectional view taken along line XXV-XXV of FIG. 24.
Figure 26:
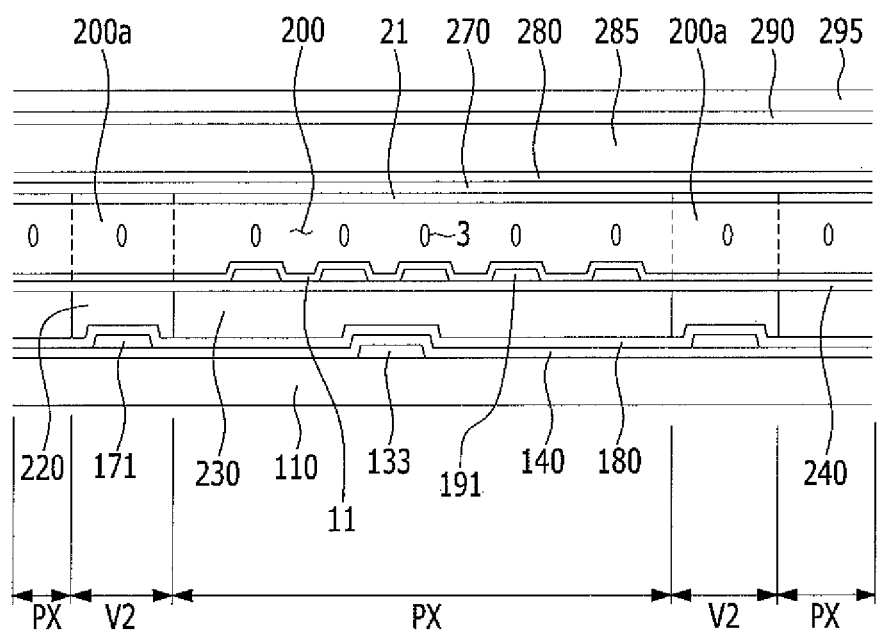
FIG. 26 is a partial cross-sectional view taken along line XXVI-XXVI of FIG. 24.

FIG. 24 is a top plan view of a display device according to an exemplary embodiment of the present invention, FIG. 25 is a partial cross-sectional view taken along line XXV-XXV of FIG. 24, and FIG. 26 is a partial cross-sectional view taken along line XXVI-XXVI of FIG. 24.

In the display device according to an exemplary embodiment of the present invention, a thin film transistor and a pixel electrode 191 connected to the thin film transistor are formed on the substrate 110. The roof layer 285 is formed on the pixel electrode 191. The roof layer 285 is separated from the pixel electrode 191 with the micro-cavity 200 interposed between the roof layer 285 and the pixel electrode 191. The liquid crystal 3 fills the micro-cavity 200. The encapsulation layer 295 is formed on the roof layer 285 and seals the micro-cavity 200.

The micro-cavity 200 is formed in each pixel area PX. Micro-cavities 200 positioned in different pixel areas PX from each other are connected to each other by the path 200a.

In an exemplary embodiment of the present invention, a plurality of paths 200a are formed between two pixel areas PX adjacent to each other.

For example, as shown in FIG. 24, in a first pixel row, two paths 200a are formed between a micro-cavity 200 positioned in a first pixel area PX and a micro-cavity 200 positioned in a second pixel area PX adjacent to the first pixel area PX. Two paths 200a are formed between the micro-cavity 200 positioned in the second pixel area PX and a micro-cavity 200 positioned in a third pixel area PX adjacent to the second pixel area PX.

However, exemplary embodiments of the present invention are not limited thereto. For example, three or more paths 200a may be formed between two pixel areas PX adjacent to each other.

A plurality of paths 200a are formed between two adjacent pixel areas PX, and thus, the liquid crystal 3 filling the micro-cavity 200 may be rendered more flowable.

One path 200a may be formed between two adjacent pixel areas PX. In this case, the width of the path 200a may be widened, and the liquid crystal 3 may be thus more flowable.

Figure 27:
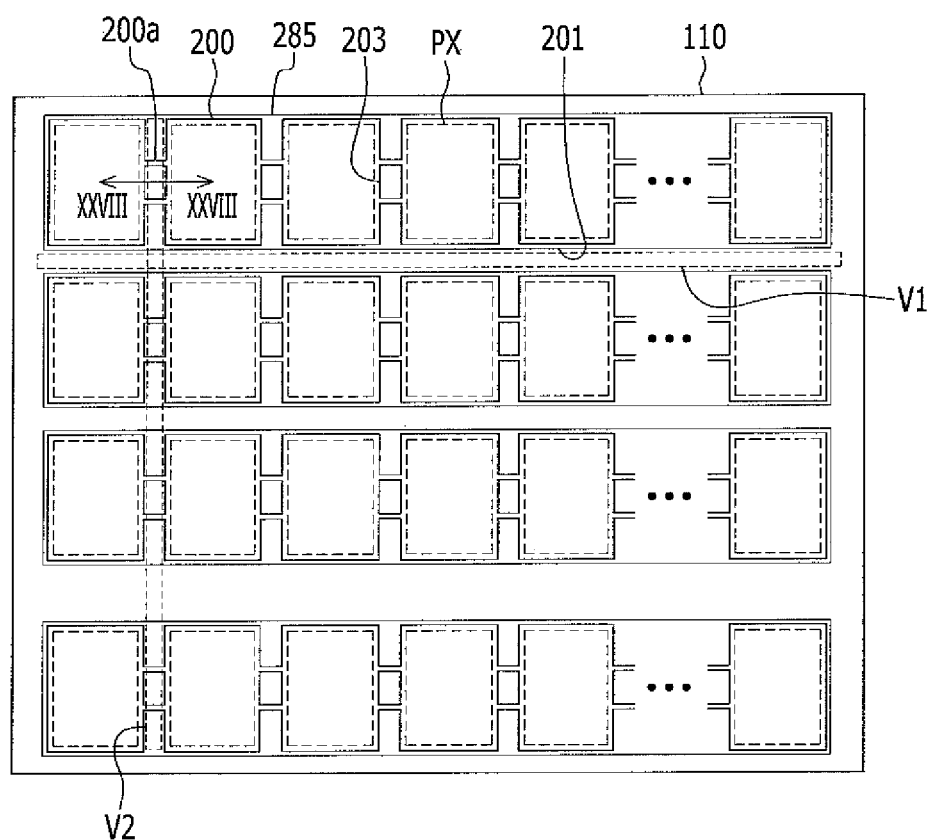
FIG. 27 is a top plan view of a display device according to an exemplary embodiment of the present invention.
Figure 28:
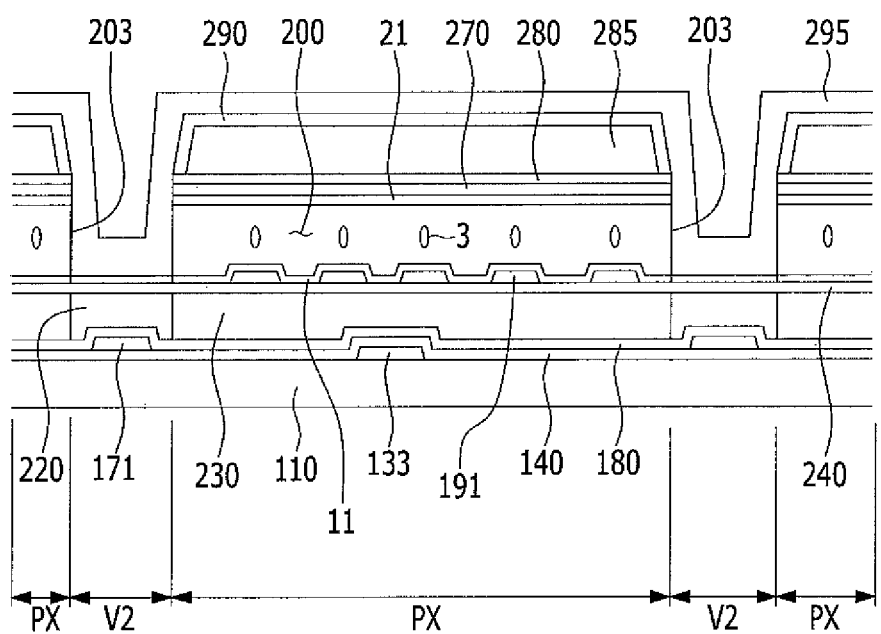
FIG. 28 is a partial cross-sectional view taken along line XXVIII-XXVIII of FIG. 27.

FIG. 27 is a top plan view of a display device according to an exemplary embodiment of the present invention, and FIG. 28 is a partial cross-sectional view taken along line XXVIII-XXVIII of FIG. 27.

In a display device according to an exemplary embodiment of the present invention, a thin film transistor and a pixel electrode 191 connected to the thin film transistor are formed on the substrate 110. The roof layer 285 is formed on the pixel electrode 191. The roof layer 285 is separated from the pixel electrode 191 with the micro-cavity 200 interposed between the roof layer 285 and the pixel electrode 191.

The first injection hole 201 exposing the portion of the micro-cavity 200 is formed in the roof layer 285. The first injection hole 201 may be formed along the first valley V1. A second injection hole 203 exposing at least a portion of the path 200a is formed in the roof layer 285. The second injection hole 203 may be formed in the second valley V2. The second injection hole 203 is formed in the roof layer 285 and exposes the upper surface of the path 200a.

The second injection hole 203 may have substantially the same area as the path 200a.

Alternatively, the second injection hole 203 may have an area larger than an area of the path 200a.

The second injection hole 203 may be formed along with the first injection hole 201 when patterning the roof layer 285. The roof layer 285, the third insulating layer 290, the second insulating layer 280, and the common electrode 270 are patterned to expose at least a portion of the path 200a.

The liquid crystal 3 fills the micro-cavity 200 and the path 200a. The encapsulation layer 295 is formed on the roof layer 285 thereby sealing the micro-cavity 200 and the path 200a. The encapsulation layer 295 covers the first injection hole 201 and the second injection hole 203.

By further forming the second injection hole 203 exposing the path 200a to the outside, removing a sacrificial layer may be easily performed, and the process time may be reduced. Further, the liquid crystal 3 may be more uniformly injected into the micro-cavities 200 through the second injection hole 203 as well as the first injection hole 201.

Figure 29:
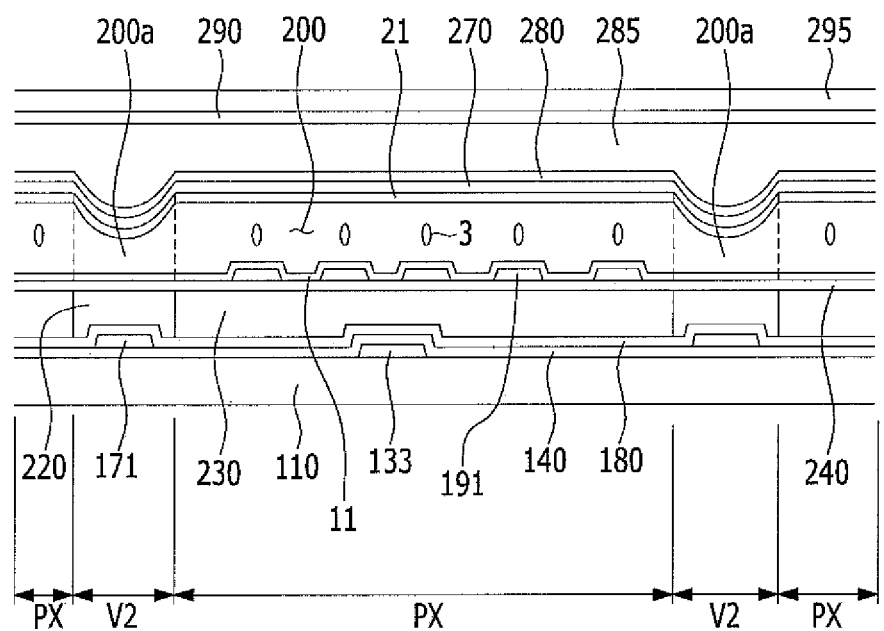
FIG. 29 is a partial cross-sectional view of a display device according to an exemplary embodiment of the present invention.

FIG. 29 is a cross-sectional view of a portion of a display device according to an exemplary embodiment of the present invention.

In an exemplary embodiment of the present invention, the path 200a may be formed to have substantially the same height as the micro-cavity 200. Alternatively, the path 200a may be formed to have a height lower than a height of the micro-cavity 200.

For example, as shown in FIG. 29, the path 200a may have a height that gradually decreases from an edge to the center. The edge of the path 200a contacts the edge of the micro-cavity 200. The edge of the path 200a may have substantially the same height as the micro-cavity 200. The micro-cavity 200 has a constant height in the entire pixel area PX. The center of the path 200a may have a height that is substantially a half of the height of the micro-cavity 200.

The shape of the path 200a may be determined by the shape of the roof layer 285. The roof layer 285 positioned on the path 200a may protrude downward. The protruding portion of the roof layer 285 may have substantially a semi-circular shape.

Figure 30:
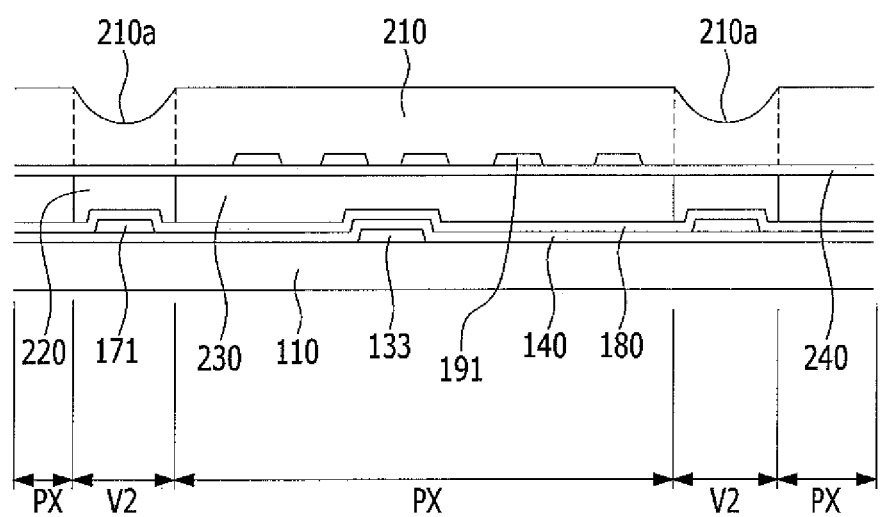
FIG. 30 to FIG. 32 are cross-sectional views of a method of manufacturing a display device according to an exemplary embodiment of the present invention.
Figure 31:
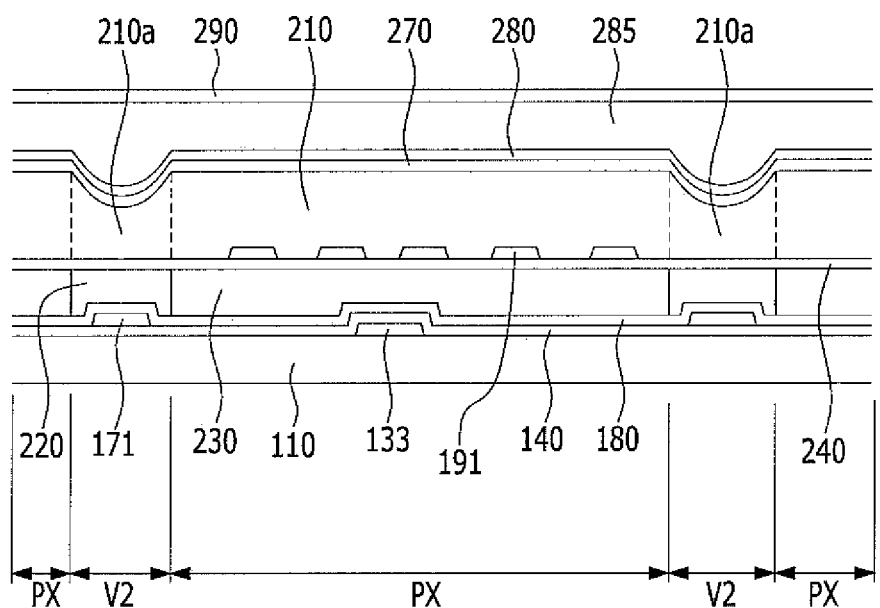
Figure 32:
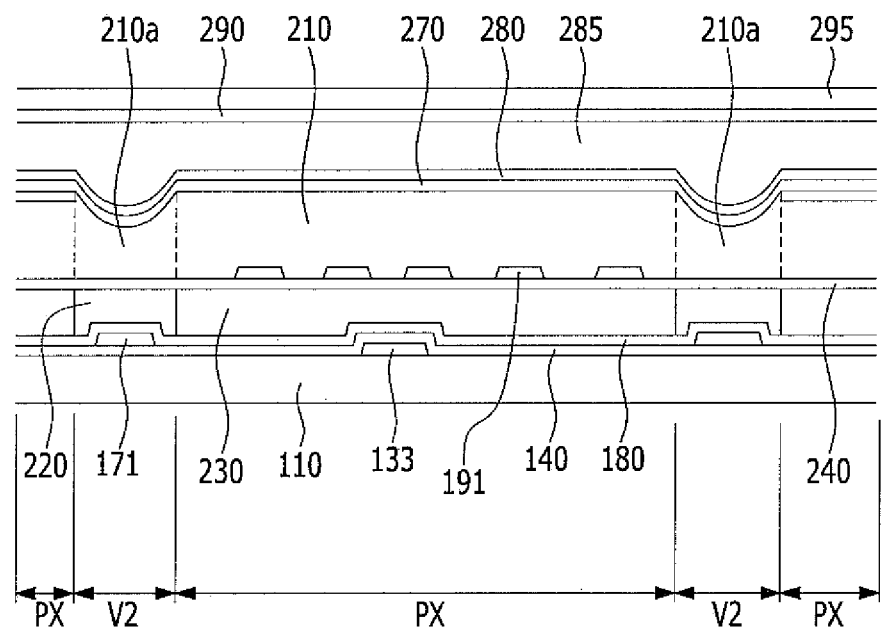

FIG. 30 to FIG. 32 are process cross-sectional views of a method of manufacturing a display device according to an exemplary embodiment of the present invention.

As shown in FIG. 30, a thin film transistor and a pixel electrode 191 connected to the thin film transistor are formed on the substrate 110.

A photosensitive organic material is coated on the pixel electrode 191 and is subjected to a photo-process, e.g., photolithography, thus forming a sacrificial layer 210 and a connection bridge 210a. Sacrificial layers 210 are connected to each other along a plurality of pixel columns, and the connection bridge 210a connects the sacrificial layers 210, which are positioned in different pixel columns from each other, to each other.

When performing the photo-process, a slit mask or a half tone mask may be used to make the height of the connection bridge 210a equal to or lower than the height of the sacrificial layer 210. For example, the entire sacrificial layer 210 may have substantially the same height, and the connection bridge 210a may have the height that is gradually decreased from an edge to the center. An upper surface of the connection bridge 210a may be depressed forming substantially a semi-circular shape.

As shown in FIG. 31, the common electrode 270, the second insulating layer 280, the roof layer 285, and the third insulating layer 290 are sequentially formed on the sacrificial layer 210. The common electrode 270, the second insulating layer 280, and the roof layer 285 each have a depressed shape in the second valley V2 along the depressed portion of the connection bridge 210a.

As shown in FIG. 32, the sacrificial layer 210 and the connection bridge 210a are removed, leaving the micro-cavity 200 in the space where the sacrificial layer 210 was removed and the path 200a in the space where the connection bridge 210a was removed. The path 200a has the height that is equal to or lower than the height of the micro-cavity 200. For example, the height of the path 200a is gradually decreased from an edge to the center.

An aligning agent is injected into the micro-cavity 200 and the path 200a, forming the first alignment layer 11 and the second alignment layer 21. The liquid crystal 3 is injected into the micro-cavity 200. An encapsulation layer 295 is formed on the roof layer 285, sealing the micro-cavity 200.

Figure 33:
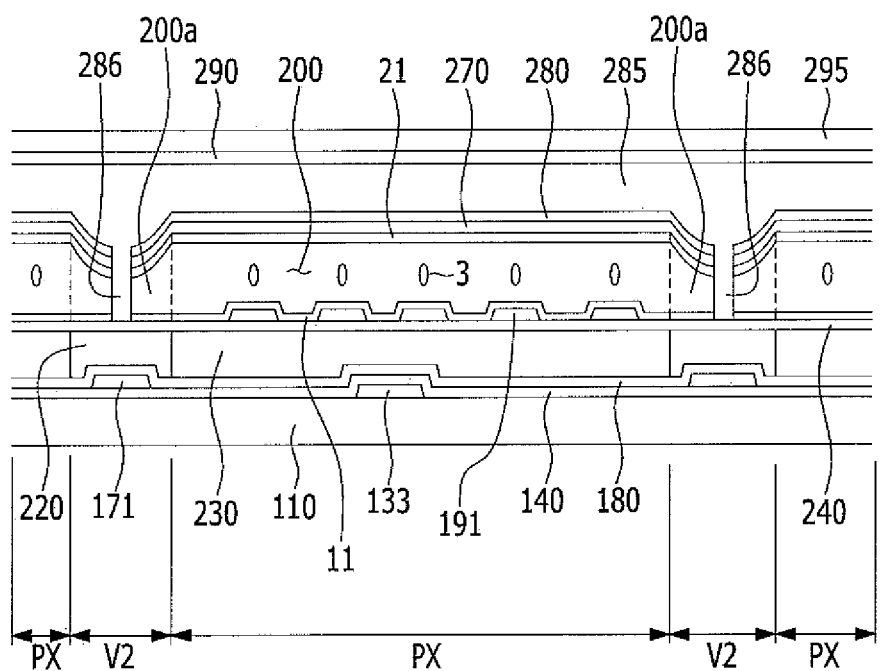
FIG. 33 is a partial cross-sectional view of a display device according to an exemplary embodiment of the present invention.

FIG. 33 is a partial cross-sectional view of a display device according to an exemplary embodiment of the present invention.

In an exemplary embodiment of the present invention, the height of the path 200a may be gradually decreased from an edge to the center, and accordingly, the roof layer 285 may be protruded downward.

In an exemplary embodiment of the present invention, a column 286 is formed through a middle portion of the path 200a. The column 286 extends from the roof layer 285 to the bottom surface of the path 200a.

The column 286 may be formed of substantially the same material as the roof layer 285. The bottom surface of the column 286 contacts the upper surface of the first insulating layer 240. The column 286 supports the roof layer 285, thereby helping maintaining the shape of the micro-cavity 200 and path 200a.

One or more columns 286 may be formed between two adjacent pixel areas PX. For example, at least one column 286 may be formed in each path 200a.

Figure 34:
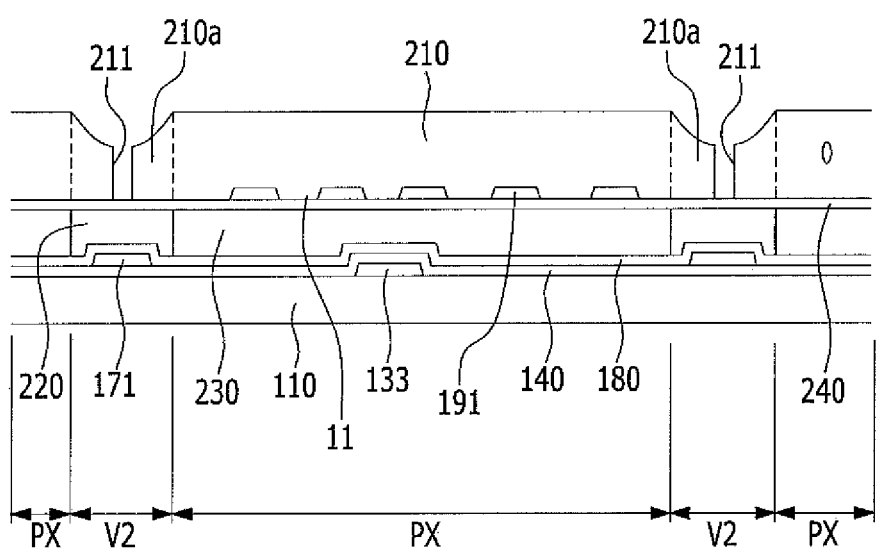
FIG. 34 to FIG. 36 are cross-sectional views of a method of manufacturing a display device according to an exemplary embodiment of the present invention.
Figure 35:
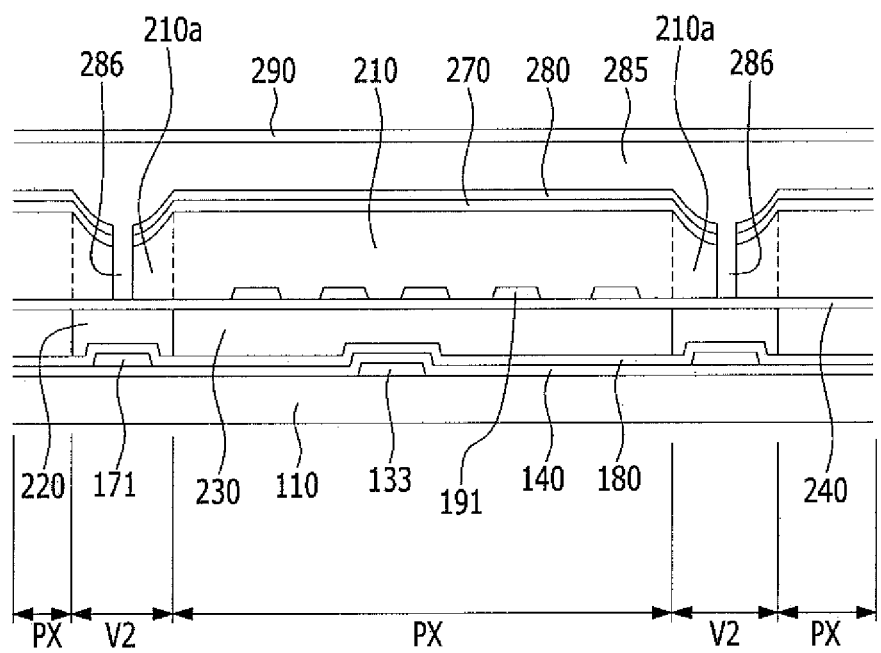
Figure 36:
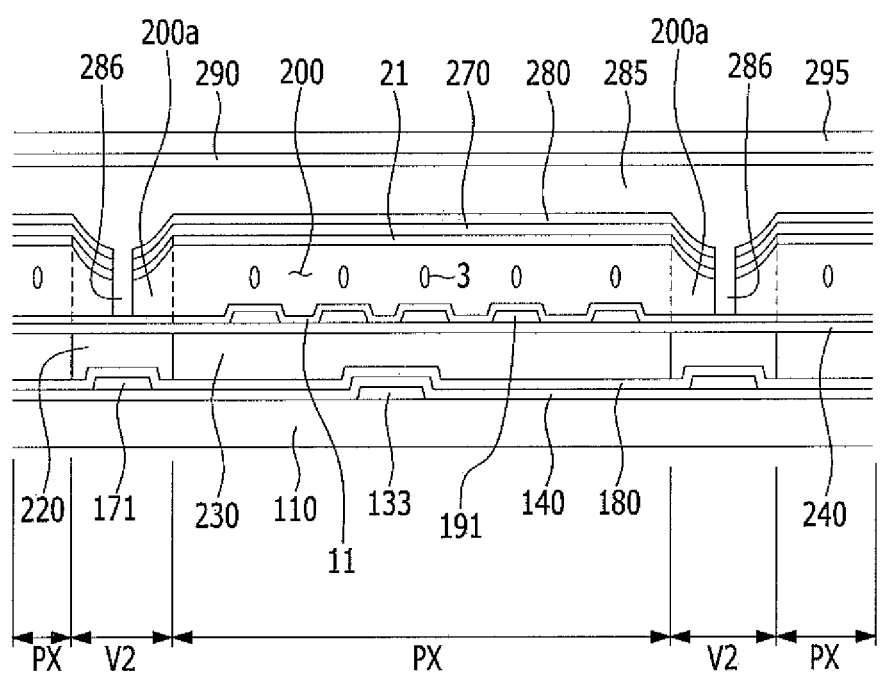

FIG. 34 to FIG. 36 are process cross-sectional views of a method of manufacturing a display device according to an exemplary embodiment of the present invention.

As shown in FIG. 34, a thin film transistor and a pixel electrode 191 connected to the thin film transistor are formed on the substrate 110.

A photosensitive organic material is coated on the pixel electrode 191 and is subjected to a photo-process, e.g., photolithography, thus forming a sacrificial layer 210 and a connection bridge 210a. Sacrificial layers 210 are connected to each other along a plurality of pixel columns, and the connection bridge 210a connects the sacrificial layers 210, which are positioned in different pixel columns from each other, to each other.

When performing the photo-process, a slit mask or a half tone mask may be used to make the height of the connection bridge 210a equal to or lower than the height of the sacrificial layer 210. A hole 211 may be further formed through a middle portion of the connection bridge 210a.

For example, the entire sacrificial layer 210 may have substantially the same height, and the connection bridge 210a may have the height that is gradually decreased from an edge to the center. For example, the upper surface of the connection bridge 210a may be depressed forming substantially a semi-circular shape. The hole 211 is formed through the middle portion of the connection bridge 210a and exposes the first insulating layer 240.

One or more holes 211 may be formed between two adjacent pixel areas PX. For example, at least one hole 211 may be formed in each connection bridge 210a.

As shown in FIG. 35, the common electrode 270 and the second insulating layer 280 are sequentially formed on the sacrificial layer 210. The common electrode 270 and the second insulating layer 280 are patterned for the common electrode 270 and the second insulating layer 280 not to be formed in the hole 211.

The roof layer 285 is formed on the second insulating layer 280. The roof layer 285 is depressed in the second valley V2 along the depressed portion of the connection bridge 210a, and the column 286 extending from the roof layer 285 is formed in a middle portion of the second valley V2. The column 286 may have substantially the same material as the roof layer 285 in substantially the same process as forming the roof layer 285.

The third insulating layer 290 is formed on the roof layer 285.

As shown in FIG. 36, the sacrificial layer 210 and the connection bridge 210a are removed, leaving the micro-cavity 200 in the space where the sacrificial layer 210 was removed and the path 200a in the space where the connection bridge 210a was removed. The path 200a may have the height that is equal to or lower than the height of the micro-cavity 20. For example, the path 200a may have the height that is gradually decreased from an edge to the center. The column 286 penetrates a middle portion of the path 200a.

An aligning agent is injected into the micro-cavity 200 and the connection bridge 210a, forming the first alignment layer 11 and the second alignment layer 21. The liquid crystal 3 is injected into the micro-cavity 200. An encapsulation layer 295 is formed on the roof layer 285, sealing the micro-cavity 200.

According to an exemplary embodiment of the present invention, the display device is manufactured by using one substrate. Therefore, the weight, thickness, cost, and process time of the display device may be reduced.

The sacrificial layers adjacent to each other are connected to each other. Therefore, the sacrificial layers may be easily removed.

The injection hole is further formed through the roof layer to reach the connection path between the micro-cavities adjacent to each other. Therefore, the liquid crystal layer and the alignment layer may be uniformly formed.

Uniform stress may be applied to the roof layer. Therefore, the roof layer may be prevented from deforming, and the cell gap may be rendered uniform.

While this invention has been particularly shown and described in connection with exemplary embodiments thereof, it is to be understood by those of ordinary skill in the art that various changes in form and details may be made thereto without departing from the spirit and scope of the invention as defined by the appended claims.

What is claimed is:

1. A display device, comprising:
   a substrate;
   a pixel electrode formed on the substrate;
   a roof layer formed on the pixel electrode;
   a first micro-cavity and a second micro-cavity, wherein the first and second micro-cavities are disposed between the pixel electrode and the roof layer; and
   a liquid crystal filling the first and second micro-cavities, wherein the first and second micro-cavities are connected to each other by a first path, and
   wherein the first path has a height that is gradually decreased from an edge of the first path to the center of the first path.

2. The display device of claim 1, wherein the first path penetrates the roof layer.

3. The display device of claim 1, wherein the substrate includes a plurality of pixel areas disposed in a matrix shape including a plurality of pixel rows and a plurality of pixel columns, wherein the roof layer is formed along a pixel row, and wherein the first and second micro-cavities are formed in a pixel row.

4. The display device of claim 3, wherein the substrate includes:
   a first valley positioned between pixel rows adjacent to each other; and
   a second valley positioned between pixel columns adjacent to each other, and wherein the first path is formed in the second valley.

5. The display device of claim 1, further comprising a second path connecting the first and second micro-cavities to each other.

6. The display device of claim 1, wherein the roof layer includes a first injection hole exposing a portion of the first micro-cavity or the second micro-cavity, and wherein the first injection hole is formed in the first valley.

7. The display device of claim 6, wherein the roof layer further includes a second injection hole exposing at least a portion of the first path.

8. The display device of claim 1, wherein the first path has a height that is substantially equal to or lower than a height of the first micro-cavity or the second micro-cavity.

9. The display device of claim 1, further comprising a column extending from the roof layer to a bottom surface of the first path through a middle portion of the first path.

10. The display device of claim 5, further comprising a first column extending from the roof layer to a bottom surface of the first path and a second column extending from the roof layer to a bottom surface of the second path.

* * * * *